US012387676B2

(12) United States Patent
Son

(10) Patent No.: US 12,387,676 B2
(45) Date of Patent: Aug. 12, 2025

(54) LIGHT EMITTING DISPLAY APPARATUS

(71) Applicant: LG Display Co., Ltd., Seoul (KR)

(72) Inventor: Woosik Son, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 18/394,681

(22) Filed: Dec. 22, 2023

(65) Prior Publication Data

US 2024/0221650 A1 Jul. 4, 2024

(30) Foreign Application Priority Data

Dec. 30, 2022 (KR) ........................ 10-2022-0190927

(51) Int. Cl.
*G09G 3/3233* (2016.01)
*G09G 3/20* (2006.01)

(52) U.S. Cl.
CPC ......... *G09G 3/3233* (2013.01); *G09G 3/2007* (2013.01); *G09G 2300/0819* (2013.01); *G09G 2300/0842* (2013.01); *G09G 2320/0233* (2013.01); *G09G 2320/0257* (2013.01)

(58) Field of Classification Search
CPC ............... G09G 3/3233; G09G 3/2007; G09G 2300/0819; G09G 2300/0842; G09G 2320/0233; G09G 2320/0257
USPC .......................................................... 345/690
See application file for complete search history.

(56) References Cited

U.S. PATENT DOCUMENTS 8,299,983 B2 * 10/2012 Levey .................. G09G 3/3233 345/212
2008/0284768 A1 * 11/2008 Yoshida ............... G09G 3/2081 345/208
2010/0103089 A1 * 4/2010 Yoshida ............... G09G 3/3426 345/102
2016/0104411 A1 * 4/2016 Nathan ................ G09G 3/3283 345/77
2020/0327845 A1 * 10/2020 Nathan ................ G09G 3/3283
2022/0102583 A1 * 3/2022 Baumheinrich ....... G02B 6/105

FOREIGN PATENT DOCUMENTS

CN 105393296 A * 3/2016 ........... G06F 9/5016
DE 112014005762 T5 * 11/2016 ............. G01R 19/00
KR 10-2013-0087927 A 8/2013

* cited by examiner

*Primary Examiner* — Kwin Xie
(74) *Attorney, Agent, or Firm* — Birch, Stewart, Kolasch & Birch, LLP

(57) ABSTRACT

A light emitting display apparatus includes a light emitting display panel having normal pixels and abnormal pixels, a control driver configured to receive input image data of the normal pixels and the normal pixels and convert the input image data into image data, and a data driver configured to output data voltages corresponding to the image data to the normal pixels and the abnormal pixels. Compensation values for compensating the input image data of the abnormal pixels are stored in the control driver. The control driver calculates final compensation values for the abnormal pixels by using lower compensation values excluding upper compensation values included in an upper K % of the compensation values, and compensates the input image data of the abnormal pixels by using the final compensation values.

10 Claims, 11 Drawing Sheets

LIGHT EMITTING DISPLAY APPARATUS

CROSS-REFERENCE TO RELATED APPLICATIONS

This application claims priority to Korean Patent Application No. 10-2022-0190927 filed in the Republic of Korea on Dec. 30, 2022, the entire contents of which is hereby expressly incorporated by reference into the present application.

BACKGROUND

Field

The present disclosure relates to a light emitting display apparatus which calculates compensation values for abnormal pixels.

Discussion of the Related Art

Light emitting display apparatuses are mounted on or provided in electronic products such as televisions, monitors, notebook computers, smart phones, tablet computers, electronic pads, wearable devices, watch phones, portable information devices, navigation devices, vehicle control display apparatus, etc., in order to display images.

A light emitting display panel configuring the light emitting display apparatus is provided with pixels, and abnormal pixels can occur due to manufacturing process errors of the light emitting display panel.

SUMMARY OF THE DISCLOSURE

If an abnormal pixel exists in a display panel and if the same data voltage is supplied both to the abnormal pixel and a normal pixel, the luminance of the abnormal pixel can be lower than that of the normal pixel. Accordingly, the abnormal pixel can display smeared images or the like.

Therefore, in order for the abnormal pixel to operate like the normal pixel, the size of a data voltage supplied to the abnormal pixel is set to be greater than the size of a data voltage supplied to the normal pixel. To this end, a method of compensating image data corresponding to abnormal pixels is applied to the light emitting display apparatus.

In this process, the inventor of the present disclosure confirmed that when a difference in compensation values for abnormal pixels is large, there can be a limitation that the luminance of the abnormal pixels with a small degree of abnormality may not be sufficiently compensated for.

Therefore, the inventor of the present disclosure invented a light emitting display apparatus in which compensation values included in a predetermined ratio among compensation values set for abnormal pixels are not considered when computing final compensation values for the remaining abnormal pixels.

Accordingly, the present disclosure is directed to providing a light emitting display apparatus that substantially obviates one or more problems due to limitations and disadvantages of the related art.

An aspect of the present disclosure is directed to providing a light emitting display apparatus which calculates final compensation values for abnormal pixels by using the remaining lower compensation values excluding upper compensation values among abnormal compensation values.

Additional advantages and features of the disclosure will be set forth in part in the description which follows and in part will become apparent to those having ordinary skill in the art upon examination of the following or can be learned from practice of the disclosure. The objectives and other advantages of the disclosure can be realized and attained by the structure particularly pointed out in the written description and claims hereof as well as the appended drawings.

To achieve these and other advantages and in accordance with the purpose of the disclosure, as embodied and broadly described herein, there is provided a light emitting display apparatus including a light emitting display panel having normal pixels and abnormal pixels, a control driver configured to receive input image data of the normal pixels and the abnormal pixels and convert the input image data into image data; and a data driver configured output data voltages corresponding to the image data to the normal pixels and the abnormal pixels, wherein compensation values for compensating the input image data of the abnormal pixels are stored in the control driver, and the control driver calculates final compensation values for the abnormal pixels by using lower compensation values excluding upper compensation values included in an upper K % of the compensation values where K is a real number, and compensates the input image data of the abnormal pixels by using the final compensation values.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION OF THE EMBODIMENTS

Figure 1:
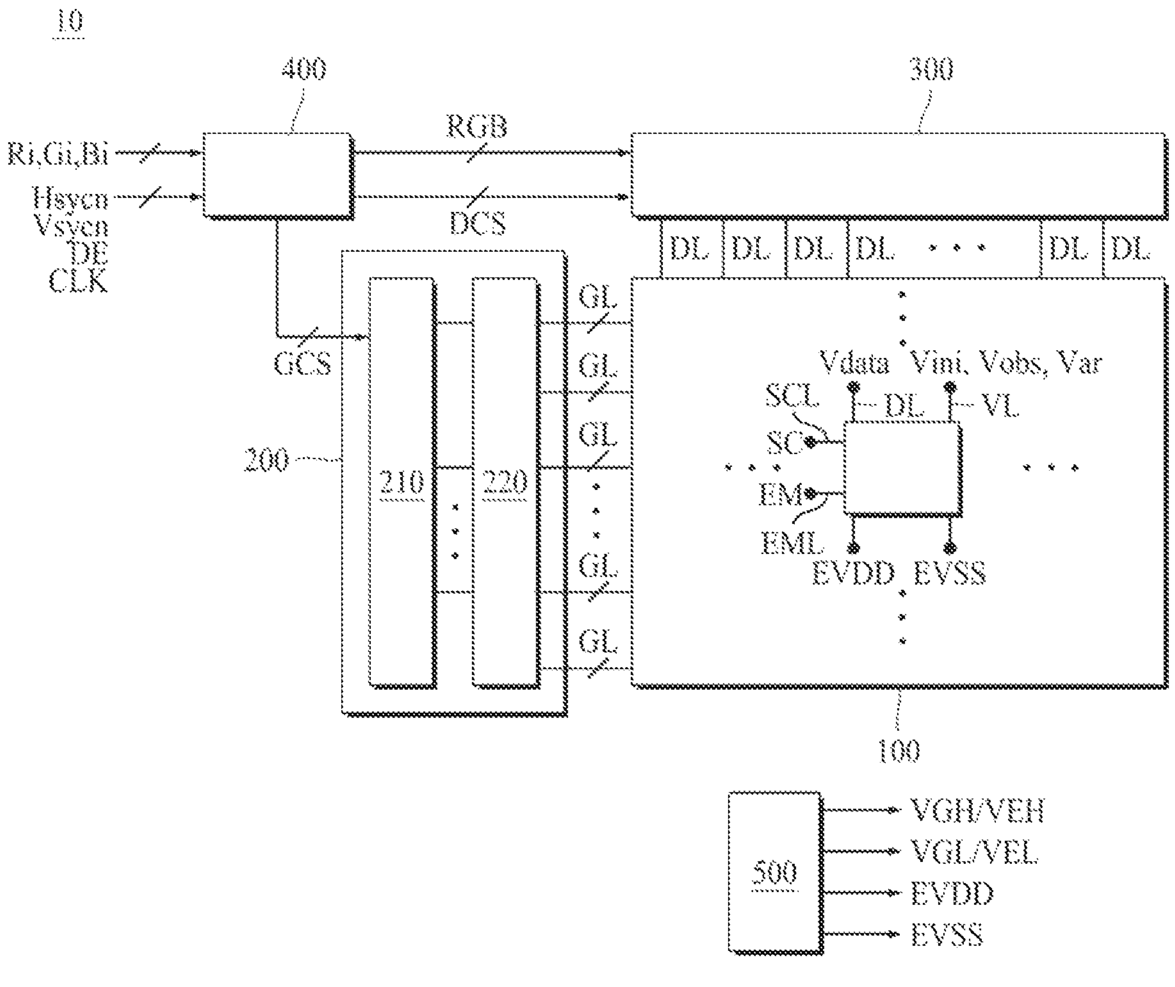
FIG. 1 is a block diagram schematically illustrating a light emitting display apparatus according to an embodiment of the present disclosure.

Reference will now be made in detail to the exemplary embodiments of the present disclosure, examples of which are illustrated in the accompanying drawings. Wherever possible, the same reference numbers will be used throughout the drawings to refer to the same or like parts.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art.

A shape, a size, a ratio, an angle, and a number disclosed in the drawings for describing embodiments of the present disclosure are merely an example, and thus, the present disclosure is not limited to the illustrated details. Like reference numerals refer to like elements throughout. In the following description, when the detailed description of the relevant known function or configuration is determined to unnecessarily obscure the important point of the present disclosure, the detailed description will be omitted. When "comprise," "have," and "include" described in the present disclosure are used, another part can be added unless "only" is used. The terms of a singular form can include plural forms unless referred to the contrary.

In construing an element, the element is construed as including an error or tolerance range although there is no explicit description of such an error or tolerance range.

In describing a position relationship, for example, when a position relation between two parts is described as, for example, "on," "above," "over," "under," and "next," one or more other parts can be disposed between the two parts unless a more limiting term, such as "just" or "direct(ly)" is used.

In describing a time relationship, for example, when the temporal order is described as, for example, "after," "subsequent," "next," and "before," a case that is not continuous can be included unless a more limiting term, such as "just," "immediate(ly)," or "direct(ly)" is used.

It will be understood that, although the terms "first," "second," etc. can be used herein to describe various elements, these elements should not be limited by these terms. These terms are only used to distinguish one element from another, and may not define order or sequence. For example, a first element could be termed a second element, and, similarly, a second element could be termed a first element, without departing from the scope of the present disclosure.

In describing elements of the present disclosure, the terms "first," "second," "A," "B," "(a)," "(b)," etc., can be used. These terms are intended to identify the corresponding elements from the other elements, and basis, order, or number of the corresponding elements should not be limited by these terms. The expression that an element is "connected," "coupled," or "adhered" to another element or layer the element or layer can not only be directly connected or adhered to another element or layer, but also be indirectly connected or adhered to another element or layer with one or more intervening elements or layers "disposed," or "interposed" between the elements or layers, unless otherwise specified.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

Features of various embodiments of the present disclosure can be partially or overall coupled to or combined with each other, and can be variously inter-operated with each other and driven technically as those skilled in the art can sufficiently understand. The embodiments of the present disclosure can be carried out independently from each other, or can be carried out together in co-dependent relationship.

Hereinafter, embodiments of the present disclosure will be described in detail with reference to the accompanying drawings. All the components of each display apparatus or each display device according to all embodiments of the present disclosure are operatively coupled and configured.

FIG. 1 is a block diagram schematically illustrating a light emitting display apparatus according to an example of the present disclosure.

Referring to FIG. 1, a light emitting display apparatus 10 includes a light emitting display panel 100 including pixels, a control driver 400, a gate driver 200 for supplying a gate signal to each of the pixels, a data driver 300 for supplying a data voltage to each of the pixels, and a power supply 500 for supplying power to each of the pixels and other parts of the display apparatus.

Figure 11:
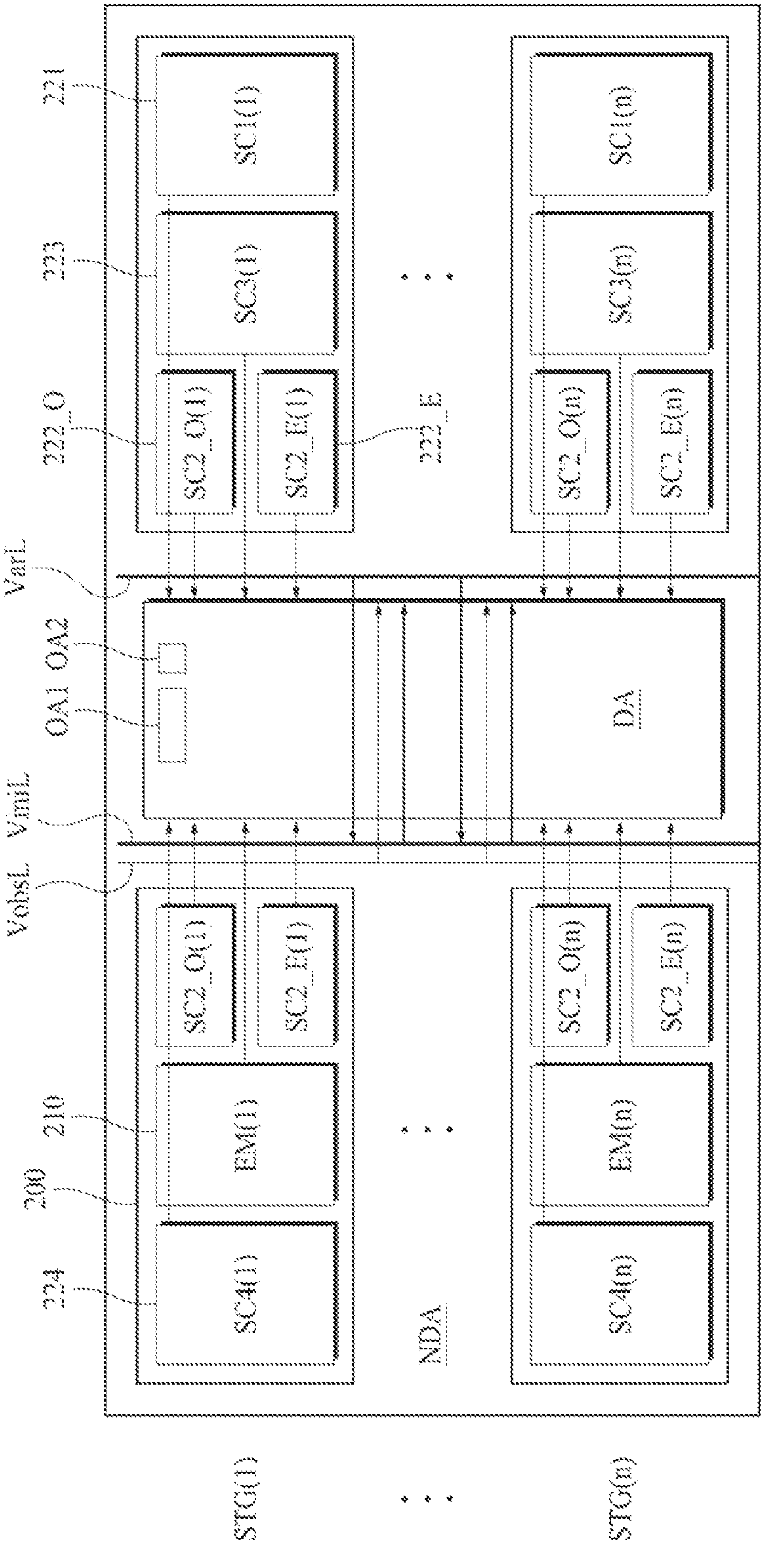
FIG. 11 is an example diagram illustrating a configuration of a gate driver applied to a light emitting display apparatus according to an embodiment of the present disclosure.
Figure 12:
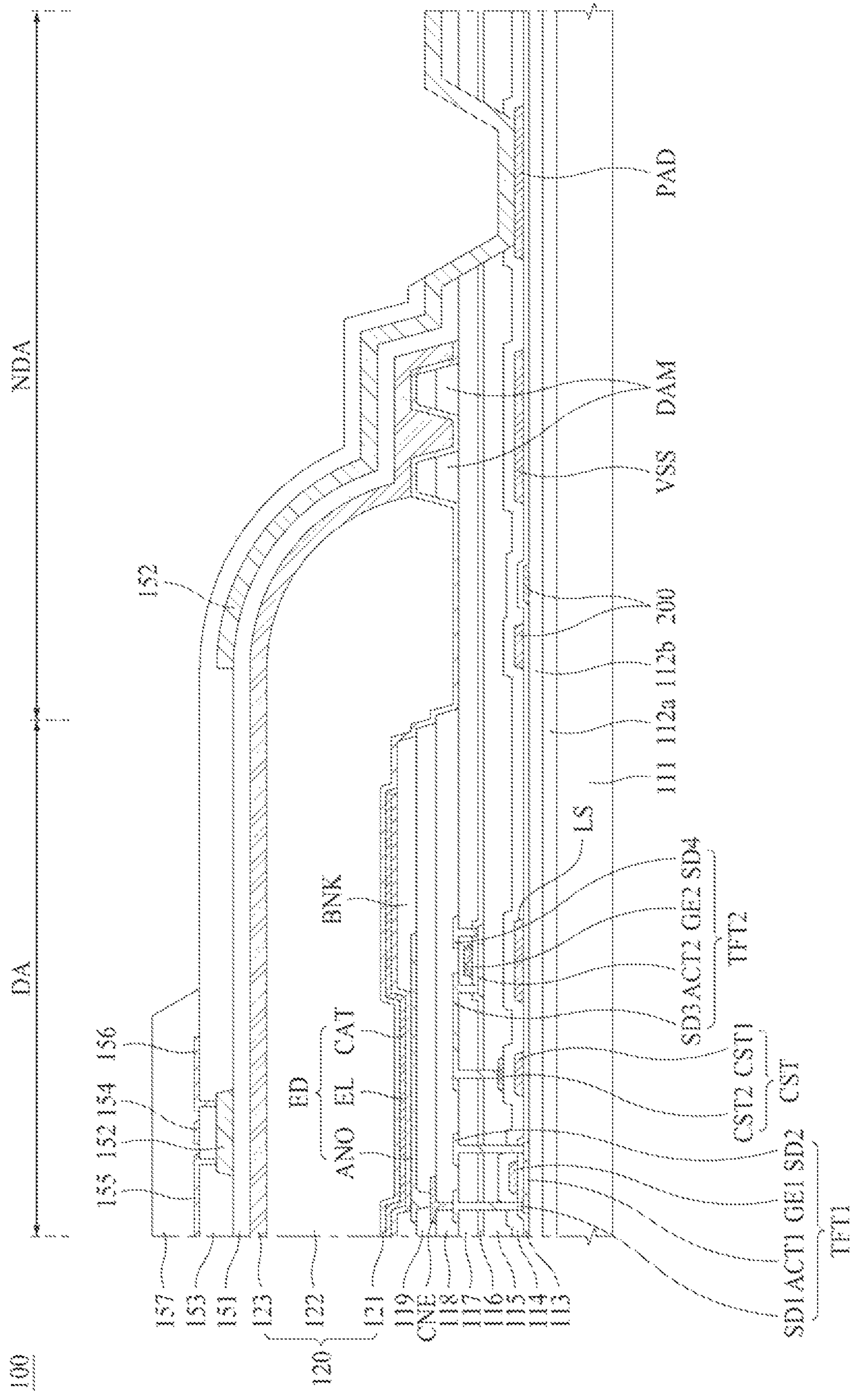
FIG. 12 is a cross-sectional view illustrating a stacked form of a light emitting display panel applied to a light emitting display apparatus according to an embodiment of the present disclosure.

The light emitting display panel 100 includes a display area DA where the pixel is provided and a non-display area NDA where the gate driver 200 and the data driver 300 are provided. The non-display area NDA is provided to surround the display area DA, e.g., entirely or only in part. The example of the display area DA and the non-display area NDA is shown in FIGS. 11 and 12, which will be discussed in more detail later.

In the light emitting display panel 100, the gate lines GL and the data lines DL cross each other, and each of the pixels is connected to the gate line GL and the data line DL. Specifically, pixel receives a gate signal from the gate driver 200 through the gate line GL, a data voltage from the data driver 300 through the data line DL, and a high potential driving voltage (for example, a first voltage) EVDD and a low potential driving voltage (for example, a second voltage) EVSS from the power supply 500.

Here, the gate line GL supplies a scan signal SC and a light emission control signal EM, and the data line DL supplies a data voltage Vdata. Moreover, in various embodiments, the gate line GL can include scan lines SCL for supplying scan signals SC and light emission control signal lines EML for supplying light emission control signals EM. Further, each of the pixels can include power lines VL to receive bias voltage Vobs and initialization voltage Var or Vini.

Each of the pixels can include a light emitting device ED and a pixel driving circuit for controlling the operation of the light emitting device ED. Here, the light emitting device ED can include an anode electrode, a cathode electrode, and a light emitting layer between the anode electrode and the cathode electrode.

The pixel driving circuit can include switching devices, driving devices, and capacitors. Here, each of the switching devices and the driving devices can be composed of a thin film transistor. In the pixel driving circuit, the driving device can control the amount of current supplied to the light emitting device ED on the basis of a data voltage to adjust the amount of light emitted by the light emitting device ED. Moreover, the switching devices can operate the pixel driving circuit by receiving a scan signal SC supplied through a plurality of scan lines SCL and a light emission control signal EM supplied through a light emission control signal line EML.

The light emitting display panel 100 can be implemented as a non-transmissive type display panel or a transmissive type display panel. The transmissive type display panel can be applied to a transparent display apparatus in which an image is displayed on a screen and a real object of a background is visible. The light emitting display panel 100 can be manufactured as a flexible display panel. The flexible display panel can be implemented as an OLED (organic light emitting display/diode) panel using a plastic substrate.

Each of the pixels can be divided into red pixels, green pixels, and blue pixels for color implementation. Each of the pixels can further include a white pixel. Different color combinations can be used in each pixel. Further, each of the pixels includes a pixel driving circuit.

Touch sensors can be disposed on the light emitting display panel 100. A touch input can be sensed using separate touch sensors or sensed through pixels. Touch sensors can be provided on the light emitting display panel in an on-cell type or an add-on type, or can be implemented as in-cell type touch sensors embedded in the light emitting display panel 100.

The control driver 400 processes input image data Ri, Gi, and Bi input from the outside according to the size and resolution of the light emitting display panel 100 and supplies the image data to the data driver 300. The control driver 400 generates a gate control signal GCS and a data control signal DCS by using synchronization signals input from the outside, for example, dot clock signal CLK, data enable signal DE, horizontal synchronization signal Hsync, and vertical synchronization signal Vsync. The control driver 400 supplies the gate control signal GCS and the data control signal DCS generated in the control driver to the gate driver 200 and the data driver 300 respectively to control the gate driver 200 and the data driver 300.

The control driver 400 can be configured in combination with various processors, for example, microprocessors, mobile processors, application processors, etc.

A host system can be any one of a television (TV) system, a set-top box, a navigation system, a personal computer (PC), a home theater system, a mobile device, a wearable device, and a vehicle system, but it is not limited thereto.

The control driver 400 can multiply the input frame frequency with i to control the operation timing of a light emitting display panel driver with the frame frequency of the input frame frequency×i (where i is a positive integer greater than 0) Hz. The input frame frequency is 60 Hz in the National Television Standards Committee (NTSC) method and 50 Hz in the Phase-Alternating Line (PAL) method.

The control driver 400 generates a signal so that the pixel can be driven at various refresh rates. For example, the control driver 400 generates signals related to driving so that the pixel can be driven in variable refresh rate (VRR) mode or can be driven between the first refresh rate and the second refresh rate. For example, the control driver 400 can simply change the speed of the clock signal, generate a synchronization signal to generate a horizontal blank or a vertical blank, or drive the gate driver 200 in a mask manner to drive the pixel at various refresh rates.

Based on the timing signal Vsync, Hsync, and DE received from the host system, the control driver 400 generates a gate control signal GCS to control the operation timing of the gate driver 200 and a data control signal DCS to control the operation timing of the data driver 300. The control driver 400 controls the operation timing of the light emitting display panel driver to synchronize the gate driver 200 and the data driver 300.

The voltage level of the gate control signal GCS output from the control driver 400 can be converted into gate-on voltage VGL or VEL and gate-off voltage VGH or VEH through a level shifter and supplied to the gate driver 200. The level shifter converts the low level voltage of the gate control signal GCS into the gate low voltage VGL and converts the high level voltage of the gate control signal GCS into the gate high voltage VGH. The gate control signal GCS includes a start pulse and a shift clock.

The gate driver 200 supplies a scan signal SC to the gate line GL based on the gate control signal GCS supplied from the control driver 400. The gate driver 200 can be disposed on one side or both sides of the light emitting display panel 100 in a gate-in panel (GIP) type.

The gate driver 200 sequentially outputs gate signals to a plurality of gate lines GL under the control of the control driver 400. The gate driver 200 can shift the gate signals by using a shift register to sequentially supply the gate signals to the gate lines GL.

The gate signal can include a scan signal SC and a light emission control signal EM in the light emitting display apparatus. The scan signal SC includes a gate pulse swinging between the gate-on voltage VGL and the gate-off voltage VGH. The light emission control signal EM can include a light emission control signal pulse swinging between the gate-on voltage VEL and the gate-off voltage VEH.

The gate pulse selects pixels of a line to which a data voltage Vdata is to be supplied in synchronization with the data voltage Vdata. The emission control signal EM determines the emission time of the pixels.

The gate driver 200 can include a light emission control signal driver 210 and at least one scan driver 220.

The light emission control signal driver 210 outputs a light emission control signal pulse in response to the start pulse and the shift clock from the control driver 400, and sequentially shifts the light emission control signal pulse based on the shift clock.

At least one scan driver 220 outputs the gate pulse in response to the start pulse and the shift clock from the control driver 400, and shifts the gate pulse based on the shift clock.

The data driver 300 converts image data RGB into data voltage Vdata based on the data control signal DCS supplied from the control driver 400 and supplies the converted data voltage Vdata to the pixel through the data line DL.

In FIG. 1, the data driver 300 is provided in one form on one side of the light emitting display panel 100, but the number and position of the data driver 300 are not limited thereto.

For example, the data driver 300 can be composed of a plurality of integrated circuits (IC) and can be divided into a plurality on one side of the light emitting display panel 100.

The power supply 500 uses a DC-DC (direct current-direct current) converter to generate DC power required to drive the pixel array of the light emitting display panel 100 and the light emitting display panel driver. The DC-DC converter can include a charge pump, a regulator, a buck converter, a boost converter, and the like. The power supply 500 receives a DC input voltage supplied from a host system to generate DC voltages such as the gate-on voltages VGL and VEL, the gate-off voltages VGH and VEH, the high potential driving voltage EVDD, the low potential driving voltage EVSS, and the like. The gate-on voltages VGL and VEL and the gate-off voltages VGH and VEH are supplied to the level shifters and the gate drivers. The high potential driving voltage EVDD and the low potential driving voltage EVSS are commonly supplied to the pixels.

Figure 2A:
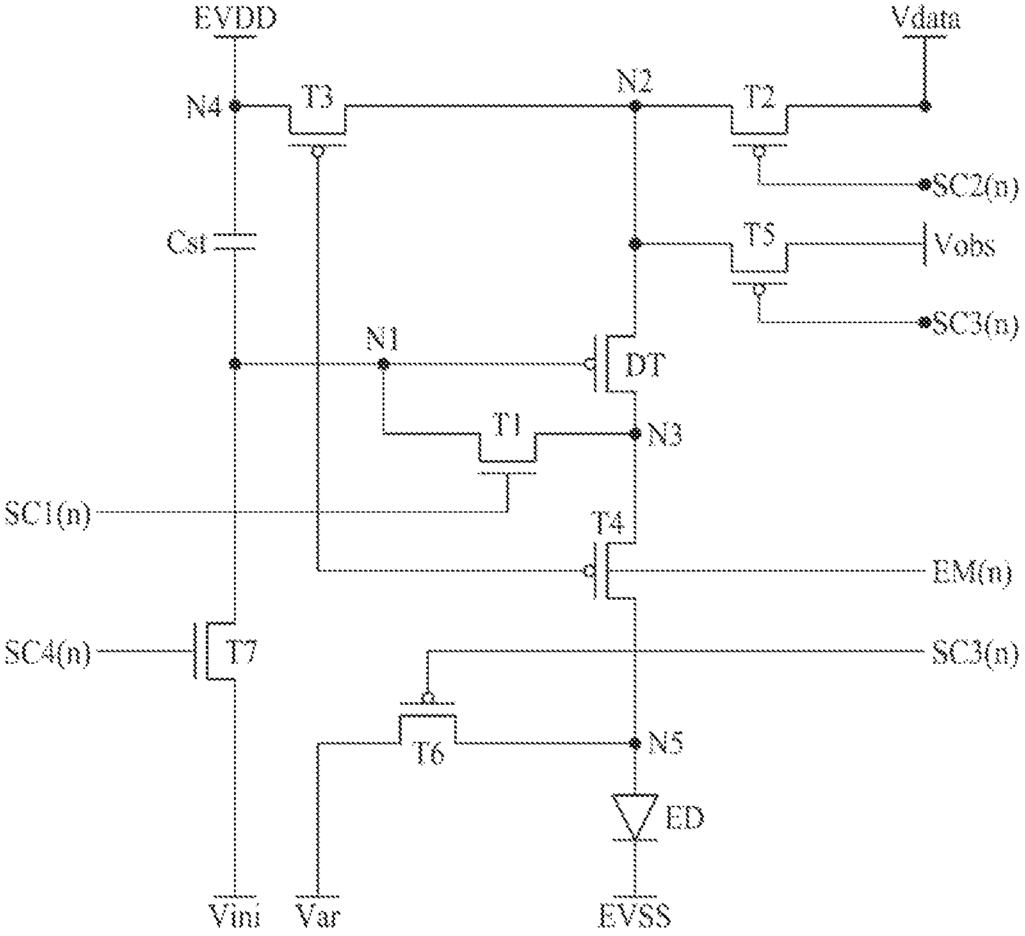
FIG. 2A is an example diagram of a pixel driving circuit applied to a light emitting display apparatus according to an embodiment of the present disclosure.
Figure 2B:
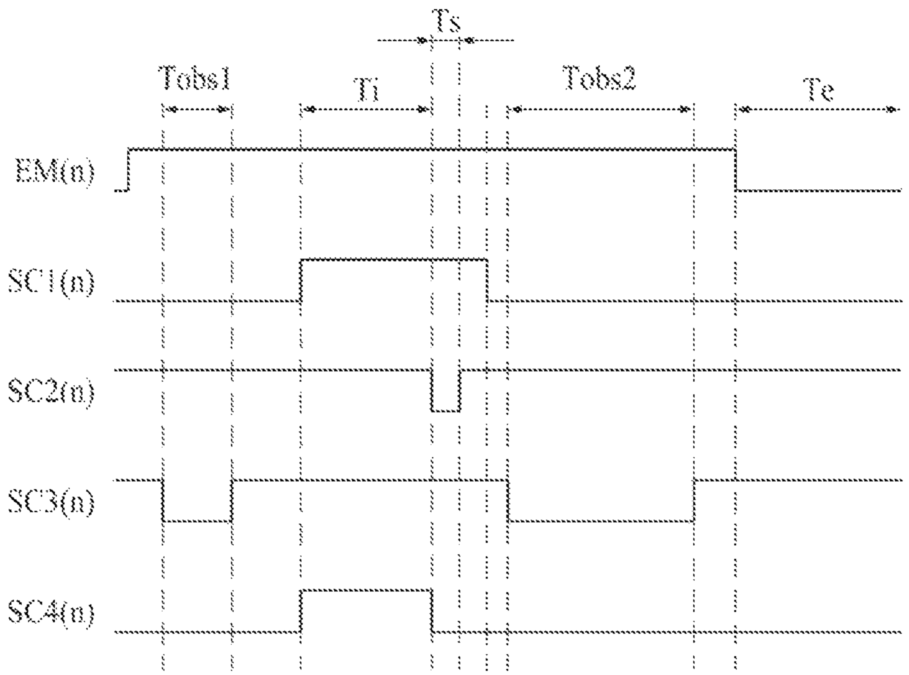
FIGS. 2B and 2C are example diagrams describing an operation of a scan signal and a light emission control signal during a refresh period and a hold period in the pixel driving circuit illustrated in FIG. 2A.
Figure 2C:
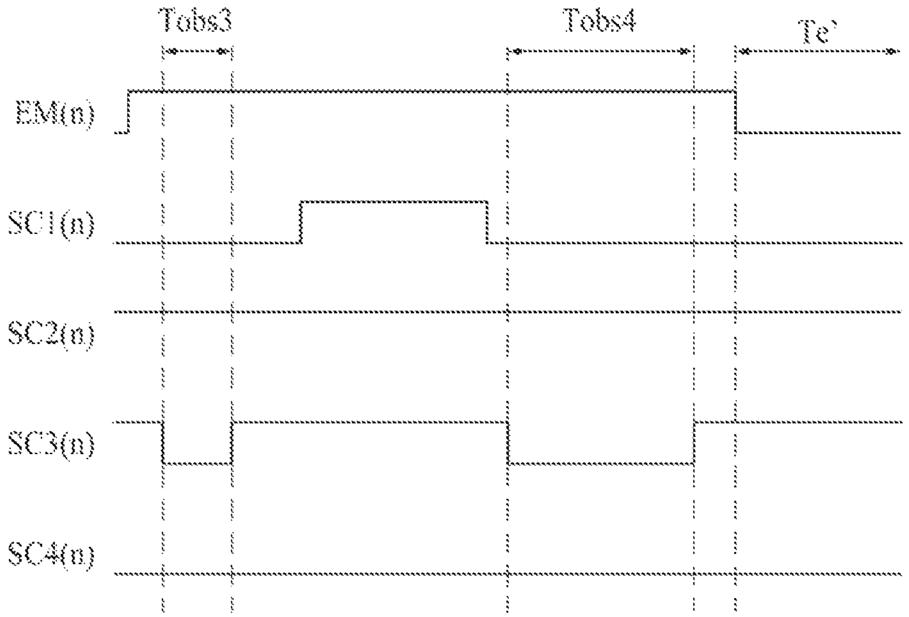
Figure 2D:
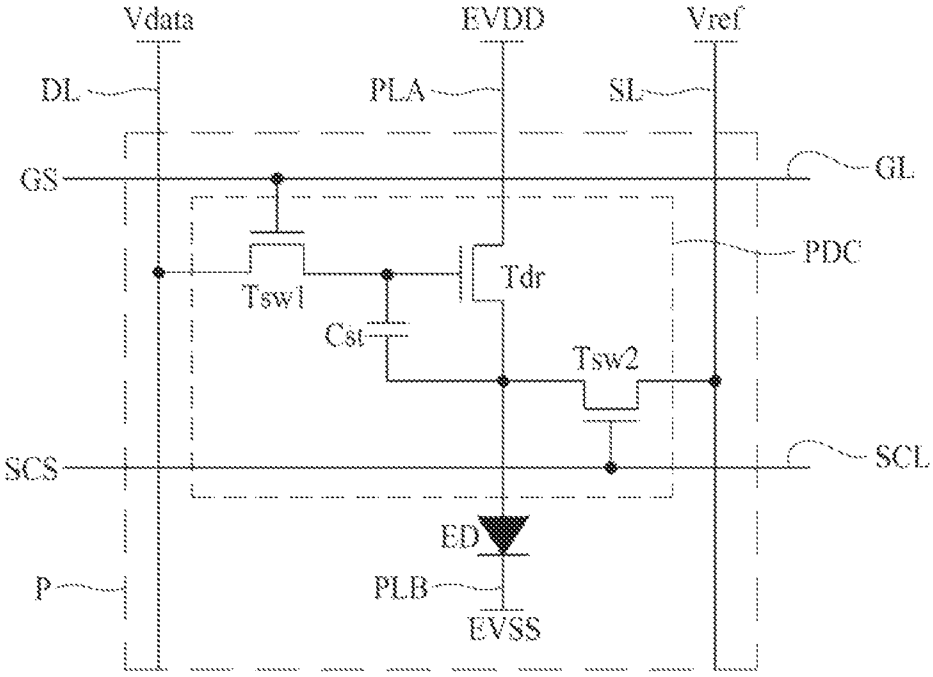
FIG. 2D is another example diagram of a pixel driving circuit applied to a light emitting display apparatus according to an embodiment of the present disclosure.

FIG. 2A is an example diagram of a pixel driving circuit applied to a light emitting display apparatus according to an embodiment of the present disclosure, FIGS. 2B and 2C are example diagrams describing an operation of a scan signal and a light emission control signal during a refresh period and a hold period in the pixel driving circuit illustrated in FIG. 2A, and FIG. 2D is another example diagram of a pixel driving circuit applied to a light emitting display apparatus according to an embodiment of the present disclosure.

FIG. 2A merely illustrates the pixel driving circuit for explanation, and the structure of the pixel driving circuit is not limited to the structure illustrated in FIG. 2A as long as it is a structure which can control the light emission of the light emitting device ED by applying a light emission control signal EM(n), where n can be a real number. For example, the pixel driving circuit can include an additional scan signal, a switching thin film transistor connected thereto, and a switching thin film transistor to which an additional initialization voltage is applied, and a connection relationship of a switching device or a connection position of a capacitor can be variously changed.

Referring to FIG. 2A, each of the plurality of pixels can include a pixel driving circuit having a driving transistor DT and a light emitting device ED connected to the pixel driving circuit.

The pixel driving circuit can drive the light emitting device ED by controlling a driving current flowing through the light emitting device ED. The pixel driving circuit can include a driving transistor DT, first to seventh transistors T1 to T7, and a capacitor Cst. Each of the transistors DT and T1 to T7 can include a first electrode, a second electrode, and a gate electrode. One of the first electrode and the second electrode can be a source electrode, and the other of the first electrode and the second electrode can be a drain electrode.

Each of the transistors DT and T1 to T7 can be a P-type thin film transistor or an N-type thin film transistor. The first transistor T1 and the seventh transistor T7 can be an N-type thin film transistor, and the other transistors DT and T2 to T6 can be a P-type thin film transistor. However, the present disclosure is not limited thereto, and all or some of the transistors DT and T1 to T7 can be a P-type thin film transistor or an N-type thin film transistor according to an embodiment. Moreover, the N-type thin film transistor can be an oxide thin film transistor, and the P-type thin film transistor can be a polycrystalline silicon thin film transistor.

Hereinafter, an embodiment in which the first transistor T1 and the seventh transistor T7 are N-type thin film transistors, and the other transistors DT and T2 to T6 are P-type thin film transistors will be described. Therefore, the first transistor T1 and the seventh transistor T7 are turned on by a high voltage, and the other transistors DT and T2 to T6 are turned on by a low voltage.

In one example, the first transistor T1 configuring the pixel driving circuit can function as a compensation transistor, the second transistor T2 can function as a data supply transistor, the third and fourth transistors T3 and T4 can function as a light emission control transistor, the fifth transistor T5 can function as a bias transistor, and the sixth and seventh transistors T6 and T7 can function as an initialization transistor.

The light emitting device ED can include an anode electrode and a cathode electrode. The anode electrode of the light emitting device ED can be connected to the fifth node N5, and the cathode electrode can be connected to the low potential driving voltage EVSS.

The driving transistor DT can include a first electrode connected to a second node N2, a second electrode connected to a third node N3, and a gate electrode connected to a first node N1. The driving transistor DT can provide the driving current to the light emitting device ED based on the voltage of the first node N1 (or a data voltage stored in the capacitor Cst described hereinafter).

The first transistor T1 can include a first electrode connected to the first node N1, a second electrode connected to the third node N3, and a gate electrode receiving a first scan signal SC1(*n*). The first transistor T1 can be turned on in response to the first scan signal SC1(*n*) and can be connected between the first node N1 and the third node N3 to sample the threshold voltage Vth of the driving transistor DT. The first transistor T1 can be a compensation transistor.

The capacitor Cst can be connected or formed between the first node N1 and the fourth node N4. The capacitor Cst can store or maintain the high potential driving voltage EVDD supplied to the capacitor Cst.

The second transistor T2 can include a first electrode connected to a data line DL (or receiving a data voltage Vdata), a second electrode connected to the second node N2, and a gate electrode receiving a second scan signal SC2(*n*). The second transistor T2 can be turned on in response to the second scan signal SC2(*n*) and can transmit the data voltage Vdata to the second node N2. The second transistor T2 can be a data supply transistor.

The third transistor T3 and the fourth transistor T4 (or the first and second light emission control transistors) can be connected between the high potential driving voltage EVDD and the light emitting device ED, and can form a current movement path through which the driving current generated by the driving transistor DT is transmitted.

The third transistor T3 can include a first electrode connected to the fourth node N4 to receive the high potential driving voltage EVDD, a second electrode connected to the second node N2, and a gate electrode receiving a light emission control signal EM(n).

The fourth transistor T4 can include a first electrode connected to the third node N3, a second electrode connected to the fifth node N5 (or an anode electrode of the light emitting device ED), and a gate electrode receiving a light emission control signal EM(n).

The third and fourth transistors T3 and T4 are turned on in response to the light emission control signal EM(n). In this case, the driving current is provided to the light emitting device ED, and the light emitting device ED can emit light with luminance corresponding to the driving current.

The fifth transistor T5 can include a first electrode receiving a bias voltage Vobs, a second electrode connected to the second node N2, and a gate electrode receiving a third scan signal SC3(*n*). The fifth transistor T5 can be a bias transistor.

The sixth transistor T6 can include a first electrode receiving a first initialization voltage Var, a second electrode connected to the fifth node N5, and a gate electrode receiving the third scan signal SC3(*n*).

The sixth transistor T6 can be turned on in response to the third scan signal SC3(*n*) before the light emitting device ED emits light (or after the light emitting device ED emits light), and can initialize the anode electrode (or pixel electrode) of the light emitting device ED by using the first initialization voltage Var. The light emitting device ED can have a parasitic capacitor formed between the anode electrode and the cathode electrode. Moreover, a parasitic capacitor can be charged while the light emitting device ED emits light, and thus, the anode electrode of the light emitting device ED can have a specific voltage. Therefore, by applying the first initialization voltage Var to the anode electrode of the light emitting device ED through the sixth transistor T6, the amount of charge accumulated in the light emitting device ED can be initialized.

In the present disclosure, the gate electrodes of the fifth and sixth transistors T5 and T6 are configured to receive the third scan signal SC3(*n*) in common. However, it is not necessarily limited to this, and thus, the gate electrodes of the fifth and sixth transistors T5 and T6 can be configured to receive separate scan signals and be controlled independently.

The seventh transistor T7 can include a first electrode receiving a second initialization voltage Vini, a second electrode connected to the first node N1, and a gate electrode receiving a fourth scan signal SC4(*n*).

The seventh transistor T7 can be turned on in response to the fourth scan signal SC4(*n*) and can initialize the gate electrode of the driving transistor DT by using the second initialization voltage Vini. The gate electrode of the driving transistor DT can have unnecessary charge remaining due to the high potential driving voltage EVDD stored in the capacitor Cst. Therefore, the amount of remaining charge can be initialized by applying the second initialization voltage Vini to the gate electrode of the driving transistor DT through the seventh transistor T7.

Referring to FIGS. 2B and 2C, the light emitting display apparatus according to an embodiment of the present disclosure can operate as a variable refresh rate (VRR) mode display apparatus. The VRR mode can operate the pixel at a constant frequency, but can operate the pixel by increasing the refresh rate at which the data voltage Vdata is changed when a high-speed driving is required, or by lowering the refresh rate when it is required to lower the power consumption or a low-speed driving is required.

Each of the plurality of pixels can be driven through a combination of a refresh frame and a hold frame within one second. In the present disclosure, one set is defined as repeating a combination of a refresh period in which the data voltage Vdata is changed and a hold period in which the data voltage Vdata is not changed for 1 second. Further, one set period can be a cycle in which the combination of the refresh period and the hold period is repeated.

When the refresh rate is driven at 120 Hz, only the refresh period can be driven. For example, the refresh period can be driven 120 times within one second. One refresh period is 1/120 (=8.33 ms), and one set period is 8.33 ms.

When the refresh rate is driven at 60 Hz, the refresh period and the hold period can be alternately driven. For example, the refresh period and the hold period can be alternately driven 60 times within 1 second. Each period of one refresh period and one hold period is 0.5/60 (=8.33 ms), and one set period is 16.66 ms.

When the refresh rate is driven at 1 Hz, one frame can be driven with one refresh period and 119 hold periods which follows the one refresh period. Moreover, when the refresh rate is driven at 1 Hz, one frame can be driven with a plurality of refresh periods and a plurality of hold periods. In this case, each period of one refresh period and one hold period is 1/120 (=8.33 ms), and one set period is 1 s.

The refresh period charges a new data voltage Vdata to apply the new data voltage Vdata to the driving transistor DT but the hold period maintains a data voltage Vdata of the previous frame and uses it. The hold period is also referred to as a skip period in the sense that a process of applying a new data voltage Vdata to the driving transistor DT is omitted.

Each of the plurality of pixels can initialize a voltage charged or remaining in the pixel driving circuit during the refresh period. Specifically, each of the plurality of pixels can remove the influence of the data voltage Vdata and the high potential driving voltage EVDD stored in the previous frame during the refresh period. Accordingly, each of the plurality of pixels can display an image corresponding to the new data voltage Vdata in the hold period.

Each of the plurality of pixels can display an image by providing a driving current corresponding to the data voltage Vdata to the light emitting device ED during the hold period, and maintain the turn-on state of the light emitting device ED.

First, driving of the pixel driving circuit and the light emitting device in the refresh period of FIG. 2B will be described. The refresh period can include at least one bias section Tobs1 and Tobs2, an initialization section Ti, a sampling section Ts, and a light emission section Te, but this is only an embodiment and the present disclosure is not necessarily limited to this order.

Referring to FIG. 2B, the pixel driving circuit can include at least one bias section Tobs1 and Tobs2 during the refresh period to operate.

At least one bias section Tobs1 and Tobs2 is a section in which an on-biased stress operation (OBS) in which a bias voltage Vobs is applied is performed. In this case, the light emission control signal EM(n) is a high voltage, and the third and fourth transistors T3 and T4 are turned off. The first scan signal SC1(*n*) and the fourth scan signal SC4(*n*) are low voltages, and the first transistor T1 and the seventh transistor T7 are turned off. The second scan signal SC2 is a high voltage and the second transistor T2 is turned off.

The third scan signal SC3(*n*) is input as a low voltage, and the fifth and sixth transistors T5 and T6 are turned on. As the fifth transistor T5 is turned on, the bias voltage Vobs is supplied to the first electrode of the driving transistor DT connected to the second node N2.

Here, the bias voltage Vobs is supplied to the third node N3 which is the drain electrode of the driving transistor DT, thereby reducing the charging time or charging delay of the fifth node N5 which is the anode electrode of the light emitting device ED. The driving transistor DT maintains a stronger saturation state.

For example, as the bias voltage Vobs increases, the voltage of the third node N3, which is the drain electrode of the driving transistor DT, can increase, and the gate-source voltage or drain-source voltage of the driving transistor DT can decrease. Accordingly, it is preferable that the bias voltage Vobs is greater than the data voltage Vdata.

In this case, the size of the drain source current passing through the driving transistor DT can be reduced, and the charging delay of the third node N3 voltage can be eliminated by reducing the stress of the driving transistor DT in a positive bias stress situation. To provide an additional description, performing an on-biased stress operation (OBS) before sampling the threshold voltage of the driving transistor DT can alleviate the hysteresis of the driving transistor DT.

Therefore, the on-biased stress operation (OBS) in at least one bias section Tobs1 and Tobs2 can be defined as an operation of directly supplying an appropriate bias voltage to the driving transistor DT during a non-emission period.

Moreover, as the sixth transistor T6 is turned on in at least one bias section Tobs1 and Tobs2, the anode electrode (or pixel electrode) of the light emitting device ED connected to the fifth node N5 is initialized to the first initialization voltage Var.

However, the gate electrodes of the fifth and sixth transistors T5 and T6 can be configured to receive separate scan signals to be controlled independently. In other words, it is not necessary to simultaneously supply the bias voltage to the first electrode of the driving transistor DT and the anode electrode of the light emitting device ED in the bias section.

Referring to FIG. 2B, the pixel driving circuit can include an initialization section Ti during a refresh period to operate. The initialization section Ti is a section for initializing the voltage of the gate electrode of the driving transistor DT.

The first scan signal SC1(*n*) to the fourth scan signal SC4(*n*) and the light emission control signal EM(n) are high voltages, and the first transistor T1 and the seventh transistor T7 are turned on. The second to sixth transistors T2, T3, T4, T5, and T6 are turned off. As the first and seventh transistors T1 and T7 are turned on, the gate electrode of the driving transistor DT connected to the first node N1 and the second electrode of the driving transistor DT are initialized to the second initialization voltage Vini.

Referring to FIG. 2B, the pixel driving circuit can include a sampling section Ts during a refresh period to operate. The sampling section Ts is a section for sampling the threshold voltage of the driving transistor DT.

The first scan signal SC1(*n*), the third scan signal SC3(*n*), and the light emission control signal EM(n) are high voltages, and the second scan signal SC2(*n*) and the fourth scan signal SC4(*n*) are low voltages. Accordingly, the third to seventh transistors T3, T4, T5, T6, and T7 are turned off, the first transistor T1 maintains an on-state, and the second transistor T2 is turned on. For example, the second transistor T2 is turned on, the data voltage Vatat is applied to the driving transistor DT, and the first transistor T1 is diode-connected between the first node N1 and the third node N3 to sample the threshold voltage of the driving transistor DT.

Referring to FIG. 2B, the pixel driving circuit can include a light emission section Te during a refresh period to operate. The light emission section Te is a section for offsetting the sampled threshold voltage and emitting the light emitting device ED with a driving current corresponding to the sampled data voltage.

The light emission control signal EM(n) is a low voltage, and the third and fourth transistors T3 and T4 are turned on.

As the third transistor T3 is turned on, the high potential driving voltage EVDD connected to the fourth node N4 is applied to the first electrode of the driving transistor DT connected to the second node N2 through the third transistor T3. The driving current Id supplied from the driving transistor DT to the light emitting device ED through the fourth transistor T4 is independent of the value of the threshold voltage Vth of the driving transistor DT, and thus, the threshold voltage Vth of the driving transistor DT is compensated.

Next, driving of the pixel driving circuit and the light emitting device in a hold period will be described with reference to FIG. 2C.

The hold period can include at least one bias section Tobs3 and Tobs4 and a light emission section Te'. Description of the operation of the pixel driving circuit which is the same as the operation of the refresh period will be omitted.

As described above, the refresh period differs from the hold period in that a new data voltage Vdata is charged in the refresh period but the hold period maintains a data voltage Vdata of the refresh period to use it. Therefore, unlike the case of the refresh period, the initialization section Ti and the sampling section Ts are not required for the hold period.

The on-biased stress operation (OBS) in the operation of the hold period can be sufficient only once. However, in this embodiment, for convenience of the driving circuit, the third scan signal SC3(*n*) of the hold period is driven the same as the third scan signal SC3(*n*) of the refresh period, and thus the on-biased stress operation (OBS) can be operated twice as in the refresh period.

The difference between the driving during the refresh period described with reference to FIG. 2B and the driving during the hold period described with reference to FIG. 2C is in the second and fourth scan signals SC2(*n*) and SC4(*n*). Unlike the case of the refresh period, the second scan signal SC2(*n*) is always a high voltage and the fourth scan signal SC4(*n*) is always a low voltage because the initialization section Ti and the sampling section Ts are not required in the hold period. For example, the second and seventh transistors T2 and T7 are always turned off.

Referring to FIG. 2D, the light emitting display panel 100 includes a display area DA and a non-display area NDA. Gate lines GL, data lines DL, and pixels P are provided in the display area DA. Accordingly, an image is output from the display area DA. The non-display area NDA surrounds an outer portion of the display area DA.

The pixel P provided in the light emitting display panel 100 can include a pixel driving circuit PDC including a switching transistor Tsw1, a storage capacitor Cst, a driving transistor Tdr, and a sensing transistor Tsw2, and a light emitting device ED connected to the pixel driving circuit PDC.

The first terminal of the driving transistor Tdr can be connected to a first voltage supply line PLA through which a first voltage EVDD is supplied, and the second terminal of the driving transistor Tdr can be connected to the light emitting device ED.

A first terminal of the switching transistor Tsw1 can be connected to the data line DL, a second terminal of the switching transistor Tsw1 can be connected to a gate of the driving transistor Tdr, and a gate of the switching transistor Tsw1 can be connected to a gate line GL.

The data voltage Vdata is supplied from the data driver 300 through the data line DL. The gate signal GS is supplied from the gate driver 200 through the gate line GL. Gate signals GS include a gate pulse which turn on the switching transistors Tsw1 and a gate-off signal which turn off the switching transistors Tsw1. The gate signal GS in FIG. 2D can correspond to the scan signal SC described with reference to FIG. 2A.

The sensing transistor Tsw2 can be provided for measuring a threshold voltage or mobility of the driving transistor or for supplying a reference voltage Vref to the pixel driving circuit PDC. A first terminal of the sensing transistor Tsw2 can be connected to a second terminal of the driving transistor Tdr and the light emitting device ED, a second terminal of the sensing transistor Tsw2 can be connected to a sensing line SL through which the reference voltage Vref is supplied, and a gate of the sensing transistor Tsw2 can be connected to a sensing control line SCL through which a sensing control signal SCS is supplied.

The sensing line SL can be connected to the data driver 300 and can be connected to the power supply 500 through the data driver 300. For example, the reference voltage Vref supplied from the power supply 500 can be supplied to the pixels through the sensing line SL, and sensing signals transmitted from the pixels P can be processed by the data driver 300.

The light emitting device ED includes a first electrode to which a first voltage EVDD is supplied through the driving transistor Tdr, a second electrode connected to a second voltage supply line PLB through which a second voltage EVSS is supplied, and a light emitting layer provided between the first electrode and the second electrode. The first electrode can be an anode, and the second electrode can be a cathode.

The structure of the pixel P applied to the present disclosure is not limited to the example structure illustrated in FIG. 2D. Accordingly, the structure of the pixel P can be changed to various types.

Figure 3:
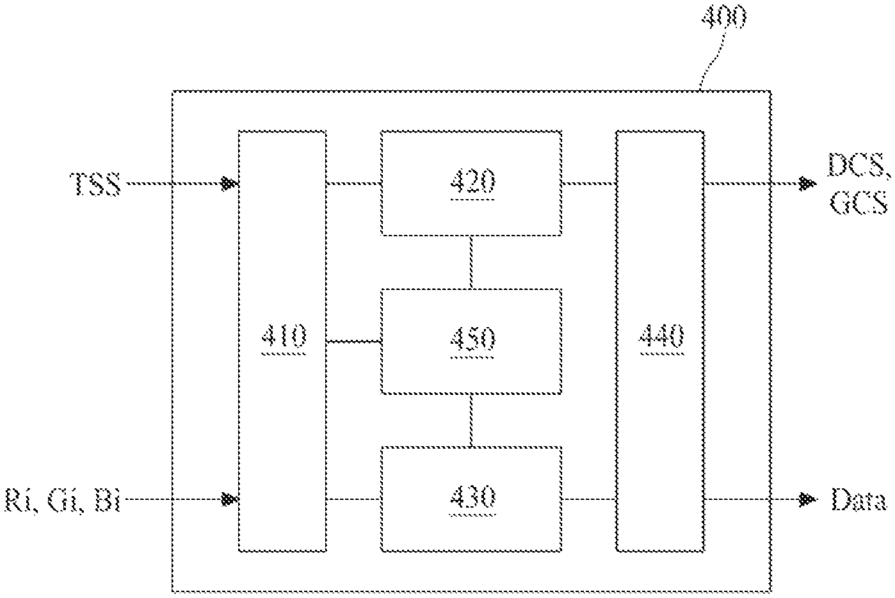
FIG. 3 is an example diagram illustrating a structure of a control driver applied to a light emitting display apparatus according to an embodiment of the present disclosure.
Figure 4:
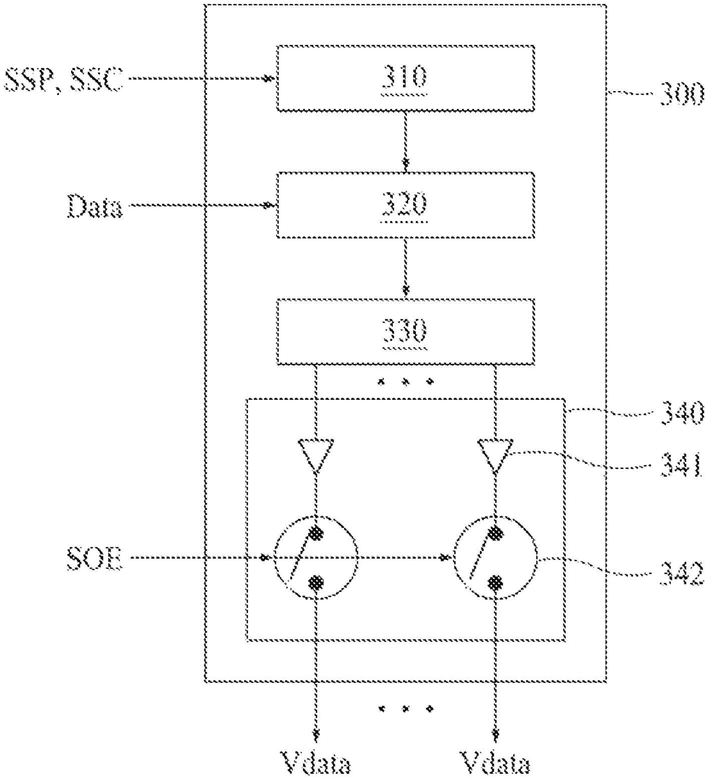
FIG. 4 is an example diagram illustrating a structure of a data driver applied to a light emitting display apparatus according to an embodiment of the present disclosure.

FIG. 3 is an example diagram illustrating a structure of a control driver applied to a light emitting display apparatus according to an embodiment of the present disclosure, and FIG. 4 is an example diagram illustrating a structure of a data driver applied to a light emitting display apparatus according to an embodiment of the present disclosure.

The light emitting display apparatus according to one or more aspects of the present disclosure can be used as various electronic devices. The electronic devices can include, for example, television and monitor.

The light emitting display apparatus according to one or more aspects of the present disclosure can include a light emitting display panel 100 which includes a display area DA displaying an image and a non-display area NDA provided outside the display area DA, a gate driver 200 which supplies gate signals to the plurality of gate lines GL provided in the display area DA of the light emitting display panel 100, a data driver 300 which supplies data voltages Vdata to the plurality of data lines DL provided in the light emitting display panel 100, a control driver 400 which controls driving of the gate driver 200 and the data driver 300, and a power supply 500 which supplies power to the control driver 400, the gate driver 200, the data driver 300, and the light emitting display panel 100.

The control driver 400 can realign input image data Ri, Gi, and Bi, which transmitted from an external system, by using a timing synchronization signal transmitted from the external system. The control driver 400 can generate a data control signal DCS to be supplied to the data driver 300 and a gate control signal GCS to be supplied to the gate driver 200.

To this end, referring to FIG. 3, the control driver 400 can include a data aligner 430 which realigns input image data Ri, Gi, and Bi to generate image data Data and supplies the image data Data to the data driver 300, a control signal generator 420 which generates the gate control signal GCS and the data control signal DCS by using the timing synchronization signal, a control unit 410 which receives the timing synchronization signal and the input image data transferred from the external system, transfers the timing synchronization signal to the control signal generator, and transfers the input video data to the data aligner, and an output unit 440 which supplies the data driver 300 with the image data Data generated by the data aligner 430 and the data control signal DCS generated by the control signal generator 420 and supplies the gate driver 200 with the gate control signal GCS generated by the control signal generator 420.

The control signal generator 420 can generate a power control signal supplied to the power supply 500.

The control driver 400 can further include a storage unit 450 for storing various information. The storage unit 450 can be included in the control driver 400, but can be separated from the control driver 400 and provided independently.

Particularly, the storage unit 450 applied to an example of the present disclosure can store compensation values for compensating input image data corresponding to abnormal pixels.

The abnormal pixel can be generated by a manufacturing process error of the light emitting display panel.

For example, the luminance of an abnormal pixel can be smaller than that of a normal pixel due to a defect in a light emitting device provided in an abnormal pixel. For example, if a defect in the light emitting device occurs due to a manufacturing process error, the luminance of the abnormal pixel can be lower than that of the normal pixel when the same data voltage is supplied to the abnormal pixel and the normal pixel.

Moreover, when foreign substances are included in the light emitting device during the manufacturing process and thus an abnormal pixel occurs, and the same data voltage is supplied to both the abnormal pixel and the normal pixel, the luminance of the abnormal pixel can be lower than that of the normal pixel.

In order for these abnormal pixels to operate like a normal pixel, the size of the data voltage supplied to the abnormal pixel can or should be greater than or less than the size of the data voltage supplied to the normal pixel. To this end, compensation for image data corresponding to the abnormal pixel is needed, and a compensation value used for the compensation is stored in the storage unit, e.g., the storage unit 450.

Hereinafter, a light emitting display apparatus in which the level of the data voltage supplied to the abnormal pixel is set to be greater than the level of the data voltage supplied to the normal pixel is described as an example of a light emitting display apparatus according to an example of the present disclosure.

In this case, compensation values can be different based on the degree of abnormality of the abnormal pixels.

For example, even when the same data voltage is supplied to abnormal pixels, luminance can vary based on the abnormal degrees of abnormal pixels.

Here, the degree of abnormality can be expressed as the degree of a smear. For example, the luminance of the abnormal pixel having a large abnormal degree can be smaller than that of the abnormal pixel having a small abnormal degree. When the luminance is small, it can be seen as a smear on the light emitting display panel 100. Accordingly, it can be said that the smear of the abnormal pixel having a large abnormal degree is larger than the smear of the abnormal pixel having a small abnormal degree.

Therefore, in the manufacturing process of the light emitting display panel 100, compensation values to be applied to abnormal pixels can be calculated based on the degree of abnormality of the abnormal pixels, and the calculated compensation values are stored in the storage unit 450.

The external system can perform a function of driving the control driver 400 and an electronic device.

For example, when the electronic device is a television (TV), the external system can receive various kinds of sound information, image information, and letter information over a communication network and can transmit the received image information to the control driver 400.

Moreover, when the electronic device is a monitor, the external system can receive image information over a communication network connected to a computer, convert the received image information into input image data Ri, Gi, and Bi, and transmit it to the control driver 400.

For example, the external system can change the image information received through the communication network into a signal recognized by the control driver 400. In this case, the signals recognized by the control driver 400 can be input image data Ri, Gi, and Bi. For example, the external system can convert image information into input image data Ri, Gi, and Bi, and the input image data Ri, Gi, and Bi can be transmitted to the control driver 400.

The power supply 500 can generate various powers and supply the generated powers to the control driver 400, the gate driver 200, the data driver 300, and the light emitting display panel 100.

The gate driver 200 can be directly embedded into the non-display area NDA by using a gate-in panel (GIP) type. Moreover, the gate driver 200 can be provided in the display area DA in which light emitting devices ED are provided or can be provided on a chip-on film mounted in the non-display area NDA.

The gate driver 200 can supply gate pulses to the gate lines GL.

When a gate pulse generated by the gate driver 200 is supplied to a gate of a switching transistor Tsw1 included in the pixel P, the switching transistor Tsw1 can be turned on. When the switching transistor is turned on, data voltage Vdata supplied through the data line can be supplied to the pixel P.

When a gate-off signal generated by the gate driver 200 is supplied to the switching transistor Tsw1, the switching transistor Tsw1 can be turned off. When the switching transistor Tsw1 is turned off, a data voltage may not be supplied to the pixel P any longer.

The gate signal GS supplied to the gate line GL can include the gate pulse and the gate-off signal.

To supply gate pulses to the gate lines GL, the gate driver 200 can include stages connected to the gate lines GL.

The features of the present disclosure are not in the gate driver 200 and any one of gate drivers of various structures currently used can be applied to the present disclosure. Accordingly, a detailed description of the gate driver 200 is omitted.

The data driver 300 can supply data voltages Vdata to the data lines DL.

To this end, referring to FIG. 4, the data driver 300 can include a shift register 310 which outputs the sampling signal, a latch portion 320 which latches image data Data received from the control driver 400, a digital-to-analog converter 330 which converts the image data Data, transferred from the latch portion 320, into a data voltage Vdata and outputs the data voltage Vdata, and an output buffer 340 which outputs the data voltage, transferred from the digital-to-analog converter 330, to the data line DL on the basis of the source output enable signal SOE.

The shift register 310 can output the sampling signal by using the data control signals DCS received from the control signal generator 420. For example, the data control signals DCS transferred to the shift register 310 can include a source start pulse SSP and a source shift clock signal SSC.

The latch portion 320 can latch the pieces of image data Data sequentially received from the control driver 400 and can simultaneously output the pieces of image data Data to the digital-to-analog converter 330 on the basis of the sampling signal.

The digital-to-analog converter (DAC) 330 can simultaneously convert the pieces of image data Data, transferred from the latch portion 320, into data voltages Vdata and can output the data voltages Vdata.

The output buffer 340 can simultaneously output the data voltages Vdata, transferred from the digital-to-analog converter 330, to the data lines DL of the display panel 100 on the basis of the source output enable signal SOE transferred from the control signal generator 420.

To this end, the output buffer 340 can include a buffer 341 which stores the data voltage Vdata transferred from the digital-to-analog converter 330 and a switch 342 which outputs the data voltage Vdata, stored in the buffer 341, to the data line DL.

For example, when the switches 342 are turned on based on the source output enable signal SOE simultaneously supplied to the switches 342, the data voltages Vdata stored in the buffers 341 can be supplied to the data lines DL through the switches 342.

The data voltages Vdata supplied to the data lines DL can be supplied to pixels P connected to the gate line GL to which the gate pulse is supplied.

The features of the present disclosure are not in the structure and function of the data driver 300, a detailed description of the specific structure and function of the data driver 300 will be omitted.

Hereinafter, various features of the light emitting display apparatus according to the present disclosure will be described with reference to FIGS. 1 to 10.

Figure 5:
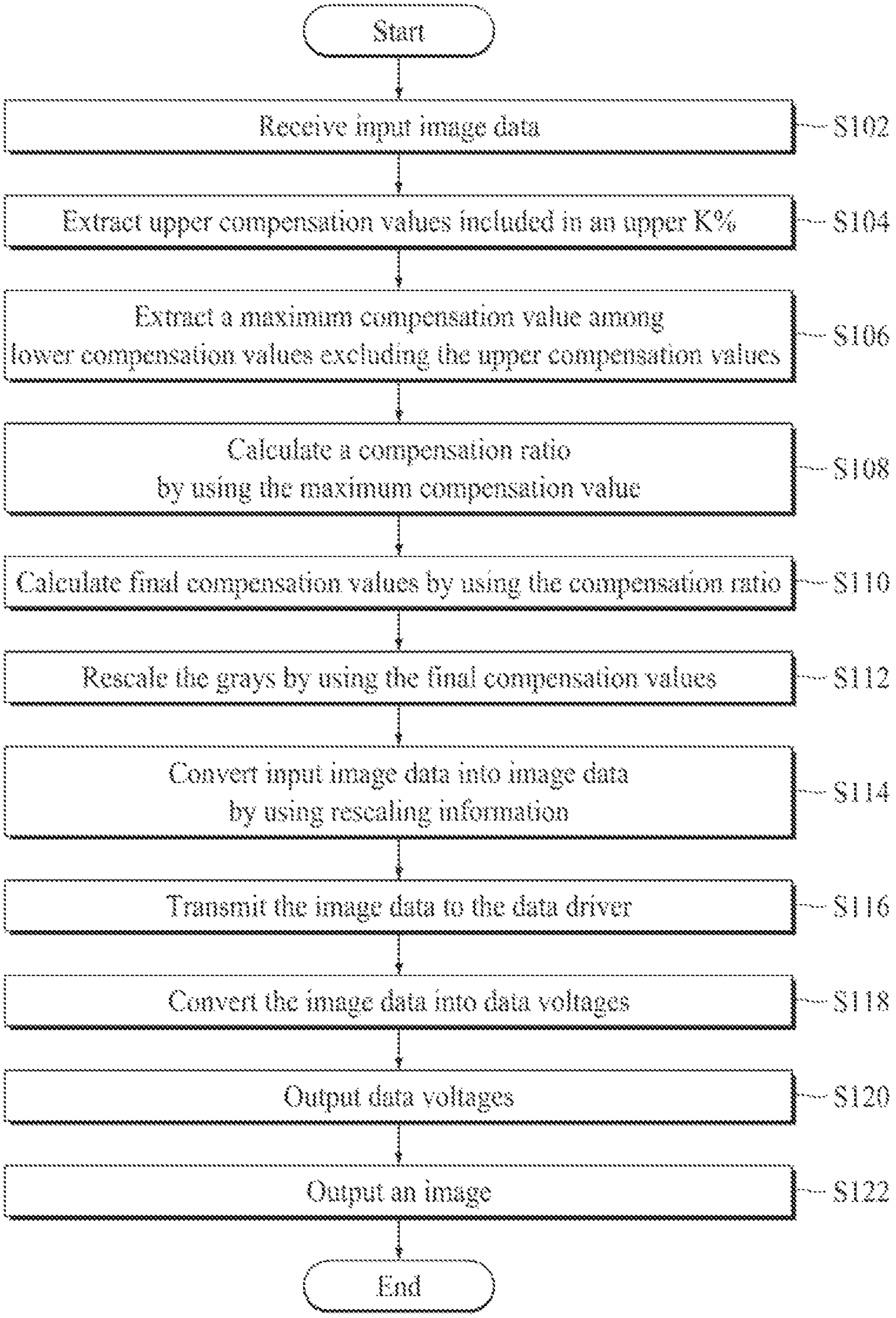
FIG. 5 is an example flowchart illustrating a method of driving a light emitting display apparatus according to an embodiment of the present disclosure.

FIG. 5 is an example flowchart illustrating a method of driving a light emitting display apparatus according to an embodiment of the present disclosure, and FIGS. 6 to 10 are various example diagrams describing a method of driving a light emitting display apparatus according to an embodiment of the present disclosure. In the following description, descriptions which are the same as or similar to descriptions given above with reference to FIGS. 1 to 4 are omitted or will be briefly given.

As described above, compensation values for abnormal pixels are stored in the storage unit 450 of the control driver 400 in the manufacturing process of the light emitting display panel 100. The compensation values can be set differently based on the degrees of smears of the abnormal pixels.

The control driver 400 can calculate final compensation values for the abnormal pixels by using remaining lower compensation values excluding upper compensation values included in an upper K % of the compensation values and generates image data by using the final compensation values. The function of the control driver 400 described below can be substantially executed by the control unit 410.

The image data Data are converted into data voltages Vdata in the data driver 300, and the data voltages Vdata are supplied to the data lines DL.

Here, K can be set in various ways based on the number of pixels and the number of abnormal pixels, and K can be any one of 0.05 to 0.15. Hereinafter, an example in which K is 0.1 will be described. Various information related to K can be stored in the storage unit 450.

Moreover, the storage unit 450 can store a reference compensation value to be applied to abnormal pixels. The reference compensation value means a compensation value which is a reference among compensation values to be applied to the abnormal pixels. Hereinafter, a light emitting display apparatus in which the reference compensation value is set to 10 will be described as an example of the present disclosure.

Referring to FIG. 5, first, the control unit 410 receives input image data R, G, and B from the external system (S102).

Next, the control driver 400 extracts upper compensation values among compensation values (S104). For example, the control driver 400 can extract compensation values included in an upper K % (e.g., 0.1%) of all of the compensation values stored in the storage unit 450 as upper compensation values.

Figure 6:
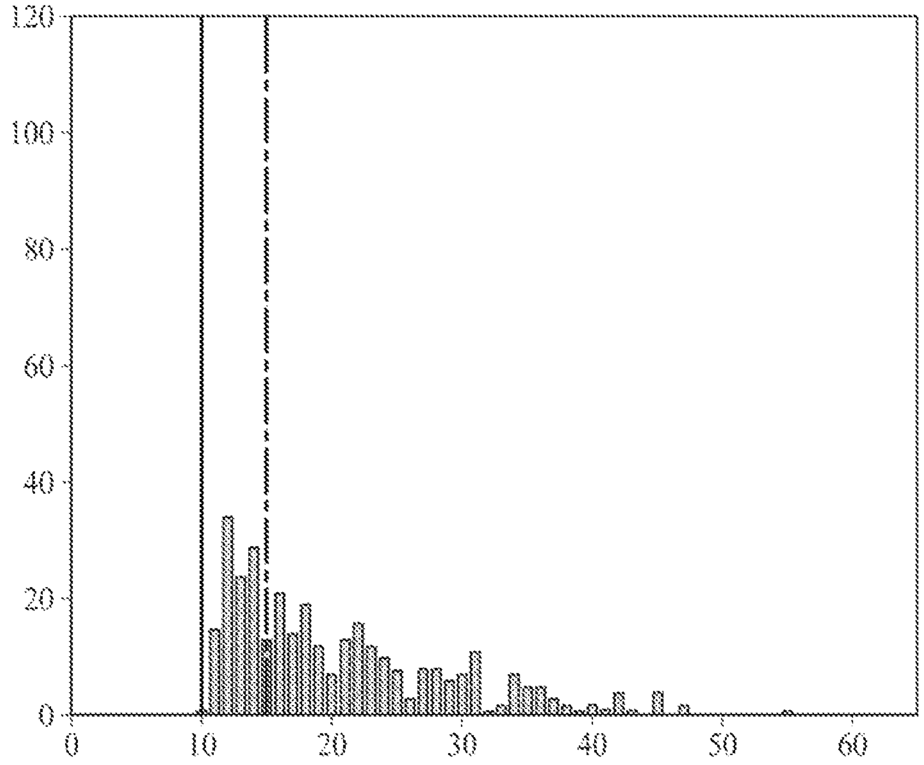
FIGS. 6 to 10 are various example diagrams describing a method of driving a light emitting display apparatus according to an embodiment of the present disclosure.
Figure 10:
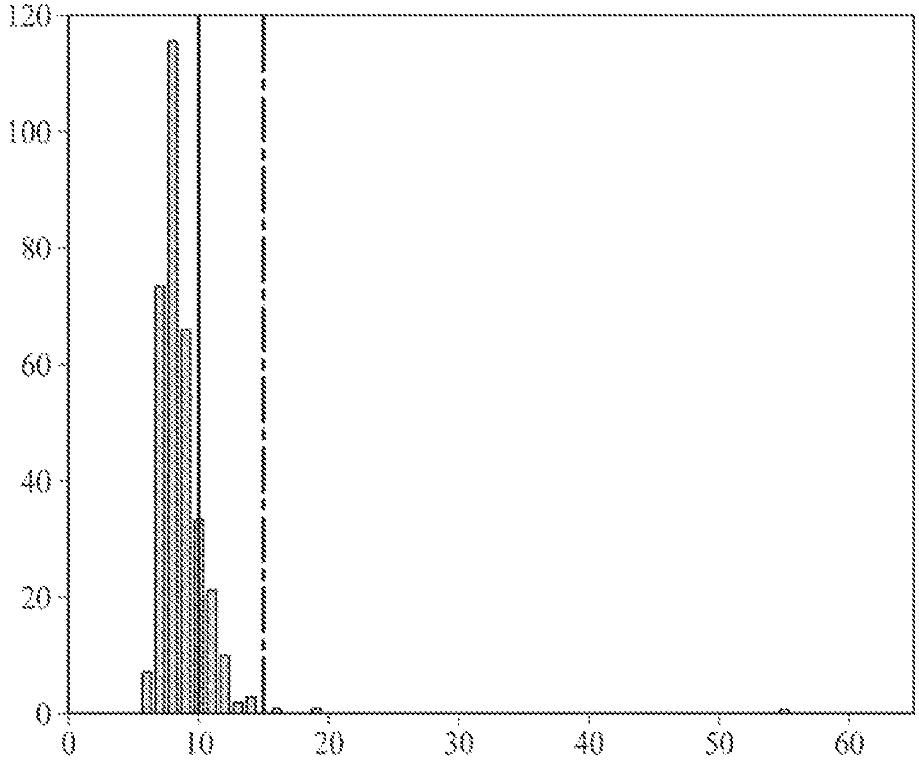

In this case, FIG. 6 is an example diagram illustrating upper maximum compensation values of 300 light emitting display panels applied to the present disclosure. For example, in FIG. 6, the horizontal axis represents the upper maximum compensation values of 300 light emitting display panels, and the vertical axis represents the number of light emitting display panels. The upper maximum compensation value means the largest compensation value among compensation values to be applied to one light emitting display panel. According to the present disclosure to be described below, upper maximum compensation values distributed between 0 and 60 as illustrated in FIG. 6, can be distributed between 0 and 15 as illustrated in FIG. 10.

For example, according to FIG. 6, the number of light emitting display panels with an upper maximum compensation value greater than 15 is more than half of the total number of light emitting display panels.

The control driver 400 can extract compensation values included in an upper 0.1% of all of the compensation values to be applied to one light emitting display panel 100 as upper compensation values. For example, in the example graph illustrated in FIG. 6, when 10,000 abnormal pixels exist in a light emitting display panel 100 having an abnormal pixel with an upper maximum compensation value of 30, the number of abnormal pixels corresponding to the upper compensation values included in upper 0.1% can be 10, and each of the 10 upper compensation values can have value between 20 and 30.

Hereinafter, a light emitting display panel including 10,000 abnormal pixels is described as an example of the present disclosure. In this case, because K is 0.1, the number of pixels corresponding to the upper compensation values is 10. A pixel having an upper compensation value is referred to as an upper compensation pixel. In this case, it is assumed that the upper compensation values have values between 20 and 30. For example, compensation values of 10 upper compensation pixels among 10,000 abnormal pixels can have values between 20 and 30. The remaining abnormal pixels except the upper compensation pixels are referred to as lower compensation pixels. Accordingly, the number of lower compensation pixels is 9,990, and compensation values of the lower compensation pixels can have values greater than 0 and less than 20. The compensation value of the lower compensation pixel is referred to as a lower compensation value.

Therefore, in a light emitting display apparatus to which the light emitting display panel 100 according to the above example is applied, the control driver 400 can extract 10 upper compensation values among 10,000 compensation values, and the 10 upper compensation values can have values between 20 and 30.

Furthermore, only the compensation values corresponding to the very small number of 10 abnormal pixels among the 10,000 abnormal pixels can have values between 20 and 30, and the compensation values corresponding to 9,990 pixels can have values greater than 0 and less than 20.

Next, the control driver 400 extracts a maximum compensation value among the lower compensation values excluding the upper compensation values (S106).

In the above example, the control driver 400 extracts a lower compensation value having the largest value among the 9,990 lower compensation values as a maximum compensation value. In the above example, it is assumed that the maximum compensation value is 15.

To provide an additional description, the largest value among the 9,990 compensation values is 15, and 15 is the maximum compensation value. In the above example, the largest value among the 10,000 compensation values is 30, and 30 is the upper maximum compensation value.

Next, the control driver 400 calculates a ratio between the maximum compensation value and the reference compensation value as a compensation ratio (S108).

In the above example, the maximum compensation value is 15, and the reference compensation value is 10. The compensation ratio is a value obtained by dividing the reference compensation value by the maximum compensation value. Therefore, the compensation ratio is two-thirds (=⅔).

Next, the control driver 400 calculates final compensation values for the abnormal pixels by using the compensation ratio (S110).

In the above example, the final compensation value of the abnormal pixel corresponding to the maximum compensation value is 15. In this case, because the compensation ratio is ⅔, the final compensation value is calculated by reducing each of the compensation values greater than 0 and less than 15 to ⅔ of its original value.

Moreover, the control driver 400 can set the maximum compensation value, for example 15, as the final compensation values of the upper compensation pixels.

In the above example, the upper compensation values of the 10 upper compensation pixels can have values between 20 and 30, and the final compensation values of the 10 upper compensation pixels can be 15.

For example, regardless of the upper compensation values, the final compensation values corresponding to the 10 upper compensation pixels among the 10,000 abnormal pixels can be 15 which is the maximum value of the lower compensation values.

Next, the control driver 400 uses the final compensation values corresponding to the 10,000 abnormal pixels to rescale the grays corresponding to the 10,000 abnormal pixels into reference range grays (S112).

In this case, grays corresponding to all normal pixels are also rescaled into the reference range grays.

Figure 7:
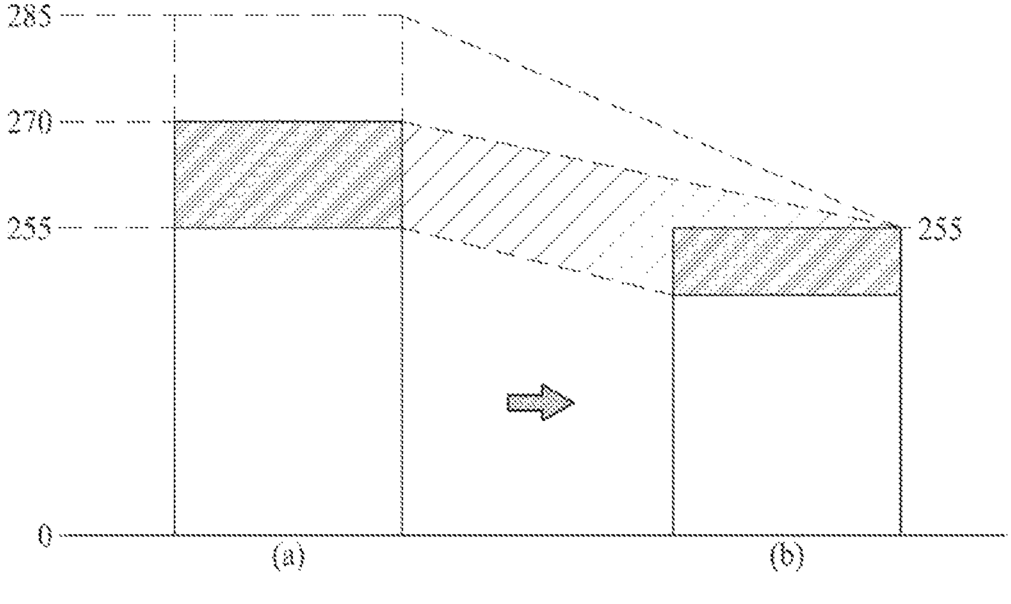

For example, because the maximum value of the final compensation values is 15, a gray of an input image data corresponding to an abnormal pixel having the final compensation value of 15 can be 270, as illustrated in (a) of FIG. 7.

In this case, because the final compensation value of the remaining abnormal pixels is 15 or less, grays of input image data corresponding to the remaining abnormal pixels can be greater than 255 and less than or equal to 270.

In this case, grays of input image data corresponding to the normal pixels can be 0 to 255, as illustrated in (a) of FIG. 7.

Because the grays which can be used in the data driver 300 is 0 to 255, the control driver 400 rescales the grays illustrated in (a) of FIG. 7 to calculate the reference range grays as illustrated in (b) of FIG. 7.

For example, the 0 to 270 grays illustrated in (a) of FIG. 7 are rescaled to generate the reference range grays having the 0 to 255 grays as illustrated in (b) of FIG. 7.

For example, the 0 to 255 grays corresponding to the normal pixels and the 256 to 270 grays corresponding to the abnormal pixels described in (a) of FIG. 7 are rescaled into the 0 to 255 grays, as illustrated in (b) of FIG. 7.

To provide an additional description, the control driver 400 generates the grays as illustrated in (a) of FIG. 7 by adding the final compensation values (for example, the final compensation values including 15 as the maximum compensation value) to the maximum value (for example, 255) of the reference range grays. After that, the control driver 400 can convert the maximum value (for example, 270) of the grays to which the final compensation values are added into the maximum value (for example, 255) of the reference range grays to generate the reference range grays as illustrated in (b) of FIG. 7.

In the above example, if the upper compensation values included in the upper K % are not excluded and are used to calculate the final compensation values, the upper maximum compensation value of 30 is used as the maximum compensation value. Therefore, the grays corresponding to the pixels become 0 to 285 as illustrated in (a) of FIG. 7 and the 0 to 285 grays can be rescaled into the 0 to 255 grays as illustrated in FIG. 7(*b*).

Figure 8:
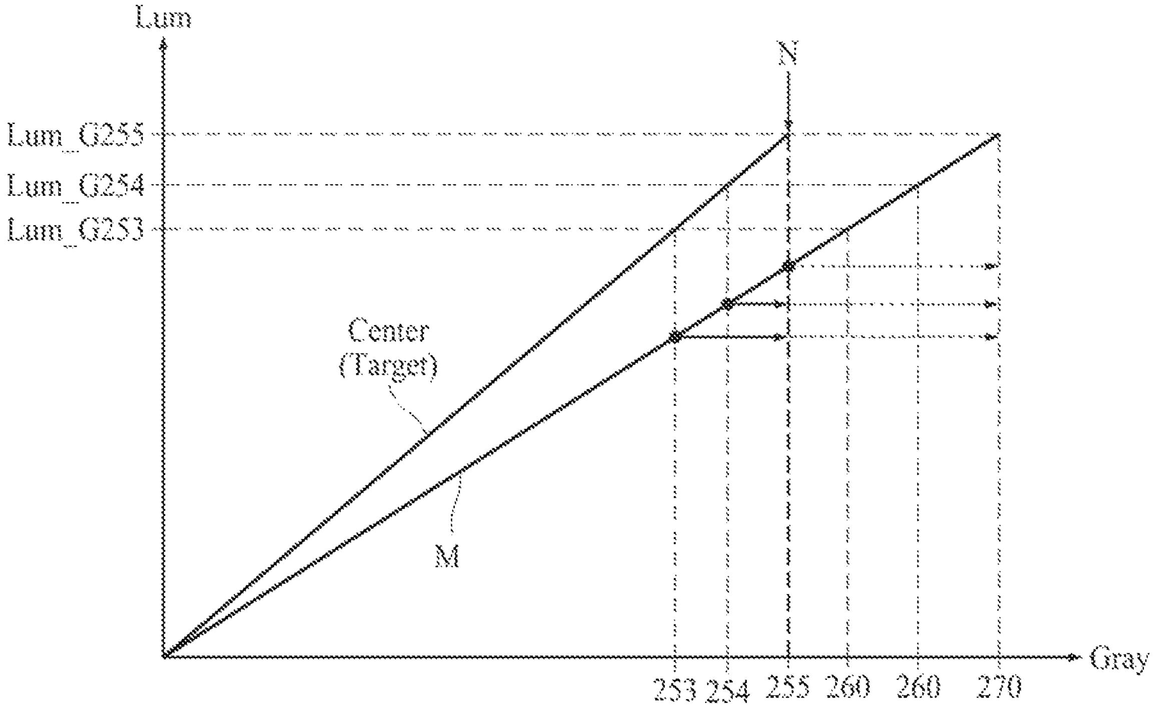

In this case, the grays corresponding to abnormal pixels can be concentrated, for example, between 250 to 255 grays in the reference range grays illustrated in (b) of FIG. 7. For example, as illustrated in FIG. 8, a gray clumping phenomenon in which grays corresponding to the abnormal pixels M are concentrated near 255 gray can occur.

Figure 9:
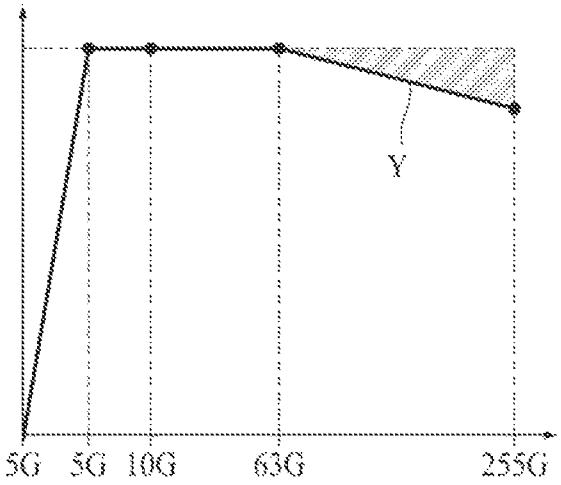

However, in the light emitting display apparatus according to an example of the present disclosure as described above, the final compensation values are calculated after the upper compensation values included in the upper K % are excluded, and as illustrated in FIG. 9, the final compensation values for the abnormal pixels can be calculated using the compensation ratio Y.

Therefore, according to the light emitting display apparatus according to the present disclosure, a limitation in which grays corresponding to the abnormal pixels are concentrated near 255 grays can be prevented and addressed.

Next, the control driver 400 converts input image data (R, G, B) into image data Data by using rescaling information, for example, information of the reference range grays (S114).

Next, the control driver 400 transmits the image data to the data driver 300 (S116).

Next, the data driver 300 converts the image data into data voltages Vdata (S118).

Finally, the data driver 300 outputs data voltages Vdata to the data lines DL when the gate pulse is transmitted to the gate line GL (S120). Accordingly, an image can be output from the light emitting display panel 100 (S122).

The characteristics of the light emitting display apparatus according to the present disclosure as described above are as follows.

First, the light emitting display apparatus according to the present disclosure can vary the grays of the input image data to 255 gray or more through bit expansion, and rescale the changed grays to 0 to 255 gray which can be used in the digital analog convertor 330.

For example, through the processes described above (S102 to S112), the grays of the input image data are finally converted into the reference range grays. For example, in the above example, the grays of the input image data are varied to 0 to 270 gray and then rescaled to 0 to 255 gray again.

This method is called the Gray to Gray Rescale (G2G) technique. FIG. 7 illustrates a G2G technique.

Next, the light emitting display apparatus according to an example of the present disclosure can calculate the compensation ratio by using the G2G value and the maximum compensation value of the light emitting display panel (S108), and adjust the ratio of the final compensation values by using the compensation ratio (S110). Accordingly, overflow in high gray can be prevented. This method is called the Overflow limit function. For example, FIG. 8 illustrates the limitation of overflow occurring near the high gray N when the Overflow limit function is not applied, and FIG. 9 illustrates how the ratio of the final compensation values is adjusted by applying the Overflow limit function (compensation ratio Y).

Next, the Overflow limit function can reduce the ratio of the entire final compensation values by using the maximum compensation value among the abnormal compensation values corresponding to the abnormal pixels provided in the light emitting display panel 100.

In this case, in a related art, if the maximum compensation value is relatively larger than other compensation values due to various noises, the Overflow limit function can be excessively applied, and thus the final compensation values can be cut globally. Accordingly, compensation may not be normally or properly made in some abnormal pixels.

To prevent or address this issue, the light emitting display apparatus according to an example of the present disclosure can extract the upper compensation values included in the upper K %, extract the maximum compensation value among the lower compensation values except the upper compensation values (S106), and apply the extracted maximum compensation value to the Overflow limit algorithm. For example, in order to prevent or minimize excessive Overflow Limit function, the light emitting display apparatus according to the present disclosure can exclude the upper compensation values included in the upper K % of the compensation values from the Overflow Limit function.

To provide an additional description, the light emitting display apparatus according to an example of the present disclosure uses the Overflow Limit function to prevent overflow of high gray, and the compensation ratio for the compensation values can be adjusted by using G2G values and the ratio (compensation ratio) of the maximum compensation values (maximum value of the lower compensation values).

Accordingly, the maximum compensation value (for example, the upper maximum compensation value, for example, the largest compensation value among the compensation values included in the upper K %) due to camera noise, foreign substances, or the like may not affect compensation for the lower compensation pixels.

Finally, as described above, when the compensation values included in the upper K % are excluded, the maximum compensation values of the light emitting display panels applied in FIG. 6 have values smaller than 15 gray, as illustrated in FIG. 7.

For example, FIG. 6 is an example diagram of the upper maximum compensation values of 300 light emitting display panels. In this case, because the upper maximum compensation values are large, compensation may not be normally performed in the abnormal pixels when the upper maximum compensation values are applied to the Overflow limit function.

However, as illustrated in FIG. 7, after the compensation values included in the upper K % are excluded, the compensation values of the light emitting display panels are mostly less than or equal to 15 gray. Therefore, if a compensation value smaller than or equal to 15 gray is applied to the Overflow limit function, compensation can be made normally in abnormal pixels.

Therefore, according to an example of the present disclosure, compensation for the remaining abnormal pixels (lower compensation pixels) except some abnormal pixels (upper compensation pixels) with abnormally large compensation values can be made normally. In this case, because the number of the upper compensation pixels is only K (for example, 0.1) % of the total number of the abnormal pixels, even when the upper compensation pixels are compensated by the maximum compensation values rather than the upper compensation values, the upper compensation pixels may not be visible to the user.

Therefore, according to the light emitting display apparatus of the present disclosure, the overall quality of the light emitting display apparatus can be improved.

Hereinafter, a circuit structure applied to a light emitting display apparatus according to the present disclosure and a structure of a light emitting display panel will be described in detail.

FIG. 11 is an example diagram illustrating a configuration of a gate driver applied to a light emitting display apparatus according to an embodiment of the present disclosure.

Referring to FIG. 11, the gate driver 200 includes a light emission control signal driver 210 and a scan driver 220. The scan driver 220 can include first to fourth scan drivers 221, 222, 233, and 234. Moreover, the second scan driver 222 can include an odd second scan driver 222_O and an even second scan driver 222_E.

In the gate driver 200, shift registers can be symmetrically provided on both sides of the display area DA. Moreover, in the gate driver 200, a shift register on one side of the display area DA can include a second scan driver 222_O and 222_E, a fourth scan driver 224, and a light emission control signal driver 210. Further, a shift register on the other side of the display area DA can include a first scan driver 221, a second scan driver 222_O and 222_E, and a third scan driver 223. However, the present disclosure is not limited thereto, and the light emission control signal driver 210 and the first to fourth scan driver 221, 222, 223, and 224 can be disposed differently based on embodiments.

The stages STG1 to STG(n) of the shift register can include first scan signal generators, second scan signal generators, third scan signal generators, fourth scan signal generators, and light emission control signal generators.

The first scan signal generator output the first scan signals SC1(1) to SC1(*n*) through the first scan lines SCL1 of the light emitting display panel 100. The second scan signal generators output the second scan signals SC2(1) to SC2(*n*) through the second scan lines SCL2 of the light emitting display panel 100. The third scan signal generator output the third scan signals SC3(1) to SC3(*n*) through the third scan lines SCL3 of the light emitting display panel 100. The fourth scan signal generators output the fourth scan signals SC4(1) to SC4(*n*) through the fourth scan lines SCL4 of the light emitting display panel 100. The light emission control signal generators output the light emission control signals EM(1) to EM(n) through the light emission control signal lines EML of the light emitting display panel 100.

The first scan signals SC1(1) to SC1(*n*) can be used as signals for driving the A-th transistor (e.g., compensation transistor, etc.) included in the pixel driving circuit. The second scan signals SC2(1) to SC2(*n*) can be used as signals for driving the B-th transistor (e.g., data supply transistor, etc.) included in the pixel driving circuit. The third scan signals SC3(1) to SC3(*n*) can be used as signals for driving the C-th transistor (e.g., bias transistor, etc.) included in the pixel driving circuit. The fourth scan signals SC4(1) to SC4(*n*) can be used as signals for driving the D-th transistor (e.g., initialization transistor, etc.) included in the pixel driving circuit. The light emission control signals EM(1) to EM(n) can be used as signals for driving the E-th transistor (e.g., light emission control transistor, etc.) included in the pixel driving circuit. For example, when the light emission control transistor of pixels is controlled by using light emission control signals EM(1) to EM(n), the light emission time of the light emitting device changes.

Referring to FIG. 11, a bias voltage bus line VobsL, a first initialization voltage bus line VarL, and a second initialization voltage bus line ViniL can be disposed between the gate driver 200 and the display area DA.

The bias voltage bus line VobsL, the first initialization voltage bus line VarL, and the second initialization voltage bus line ViniL can supply the bias voltage Vobs, the first initialization voltage Var, and the second initialization voltage Vini from the power supply 500 to the pixel driving circuit, respectively.

In FIG. 11, each of the bias voltage bus line VobsL, the first initialization voltage bus line VarL, and the second initialization voltage bus line ViniL is provided only on one side of the left side and the right side of the display area DA, but the present disclosure is not limited thereto. Therefore, each of the bias voltage bus line VobsL, the first initialization voltage bus line VarL, and the second initialization voltage bus line ViniL can be provided on both sides, and even when it is provided on one side, the position of the left or right side is not limited.

Referring to FIG. 11, one or more optical regions OA1 and OA2 can be disposed in the display area DA.

One or more optical region OA1 and OA2 can be disposed to overlap one or more optical electronic device such as photographing device such as camera (image sensor), proximity sensor, and detection sensor such as illumination sensor.

One or more optical region OA1 and OA2 can have a light transmitting structure and transmittance above a certain level for the operation of an optical electronic device. To provide an additional description, the number of pixels per unit area in one or more optical area OA1 and OA2 can be less than the number of pixels per unit area in the general area except the optical area OA1 and OA2 in the display area DA. For example, the resolution of the one or more optical region OA1 and OA2 can be lower than that of the general region in the display area DA.

In one or more optical region OA1 and OA2, the light transmitting structure can be formed by patterning the cathode electrode in a region where the pixel is not disposed. In this case, the cathode electrode can be selectively removed by using a laser, or a cathode electrode can be selectively formed and patterned by using a material such as a cathode deposition prevention layer.

Moreover, the light transmitting structure in one or more optical area OA1 and OA2 can be formed by separating the light emitting device ED and the pixel driving circuit in the pixel. To provide an additional description, the light emitting device ED of the pixel is disposed in the optical area OA1 and OA2, and a plurality of transistors TFT configuring the pixel driving circuit are disposed around the optical area OA1 and OA2, and the light emitting device ED and the pixel driving circuit can be electrically connected to each other through a transparent metal layer.

FIG. 12 is a cross-sectional view illustrating a stacked form of a light emitting display panel applied to a light emitting display apparatus according to an embodiment of the present disclosure. In the following description, a reference numeral different from a reference numeral shown in FIG. 12 can refer to the same element as the one shown in FIG. 12. Moreover, In the following description, a reference numeral different from the reference numeral used above can be given to the same configuration as the above-described configuration.

Particularly, FIG. 12 is a cross-sectional view including two switching thin film transistors TFT1 and TFT2 and one capacitor CST. The two thin film transistors TFT1 and TFT2 include one of a switching thin film transistor and a driving transistor including a polycrystalline semiconductor material and an oxide thin film transistor including an oxide semiconductor material. In this case, a thin film transistor including a polycrystalline semiconductor material is referred to as a polycrystalline thin film transistor TFT1, and a thin film transistor including an oxide semiconductor material is referred to as an oxide thin film transistor TFT2.

The polycrystalline thin film transistor TFT1 illustrated in FIG. 12 is an emission switching thin film transistor connected to a light emitting device ED, and the oxide thin film transistor TFT2 is switching thin film transistor connected to a capacitor CST.

A pixel includes a light emitting device ED and a pixel driving circuit which supplies a driving current to the light emitting device ED. The pixel driving circuit is disposed on the substrate 111, and the light emitting device ED is disposed on the pixel driving circuit. Moreover, an encapsulation layer 120 is disposed on the light emitting device ED. The encapsulation layer 120 protects the light emitting device ED.

The pixel driving circuit can be referred to as a pixel array unit including a driving thin film transistor, a switching thin film transistor, and a capacitor. Moreover, the light emitting device ED can be refer to as an array unit including an anode electrode, a cathode electrode, and a light emitting layer disposed between them for light emission.

In an embodiment, the driving thin film transistor and at least one switching thin film transistor use an oxide semiconductor as an active layer. Thin film transistor using oxide semiconductor material as an active layer have excellent leakage current blocking effects and are relatively cheaper than thin film transistors using polycrystalline semiconductor material as an active layer in a manufacturing cost. Therefore, in order to reduce power consumption and manufacturing cost, a pixel driving circuit according to one embodiment includes a driving thin film transistor using an oxide semiconductor material and at least one switching thin film transistor using an oxide semiconductor material.

All thin film transistors configuring the pixel driving circuit can be implemented by using an oxide semiconductor material, and only some switching thin film transistors can be implemented by using an oxide semiconductor material.

However, since thin film transistors using oxide semiconductor materials can be difficult to secure reliability, and thin film transistors using polycrystalline semiconductor materials have fast operating speed and excellent reliability, one embodiment of the present disclosure can include both switching thin film transistors using oxide semiconductor materials and switching thin film transistors using polycrystalline semiconductor materials.

The substrate 111 can be implemented as a multi-layer in which an organic layer and an inorganic layer are alternately stacked. For example, the substrate 111 can be stacked with an organic layer such as polyimide and an inorganic layer such as silicon oxide (SiO2) alternately.

A lower buffer layer 112*a* is provided on the substrate 111. The lower buffer layer 112*a* is for blocking moisture, etc., which can penetrate from the outside, and can be used by stacking a silicon oxide (SiO2) layer, etc. in a multilayer. An auxiliary buffer layer 112*b* can be further provided on the lower buffer layer 112*a* to protect the device from moisture permeation.

A polycrystalline thin film transistor TFT1 is formed on the substrate 111. The polycrystalline thin film transistor TFT1 can use a polycrystalline semiconductor as an active layer. The polycrystalline thin film transistor TFT1 includes a first active layer ACT1 including a channel through which electrons and holes move, a first gate electrode GE1, a first source electrode SD1, and a first drain electrode SD2.

The first active layer ACT1 includes a first channel region, a first source region disposed on one side with the first channel region in between, and a first drain region disposed on the other side.

The first source region and the first drain region are regions where intrinsic polycrystalline semiconductor materials are doped with group 5 or group 3 impurity ions, such as phosphorus (P) or boron (B) at a predetermined concentration to form a conductor. The first channel region is a region in which the polycrystalline semiconductor material maintains an intrinsic state and the first channel region provides a path through which electrons or holes move.

The polycrystalline thin film transistor TFT1 includes a first gate electrode GE1 overlapping the first channel region of the first active layer ACT1. A first gate insulation layer 113 is disposed between the first gate electrode GE1 and the first active layer ACT1. The first gate insulation layer 113 can be formed by stacking an inorganic layer such as a silicon oxide (SiO2) layer and silicon nitride (SiNx) layer, or the like, in a single layer or a multilayer.

In one embodiment, the polycrystalline thin film transistor TFT1 is a top gate structure in which the first gate electrode GE1 is provided above the first active layer ACT1. Accordingly, the first electrode CST1 included in the capacitor CST and a light blocking layer LS included in the oxide thin film transistor TFT2 can be formed of the same material as the first gate electrode GE1. The mask process can be reduced by forming the first gate electrode GE1, the first electrode CST1, and the light blocking layer LS through one mask process.

The first gate electrode GE1 is made of a metal material. For example, the first gate electrode GE1 can be a single layer or multilayer made of any one of molybdenum (Mo), aluminum (Al), chromium (Cr), gold (Au), titanium (Ti), nickel (Ni), neodymium (Nd), and copper (Cu), or alloys thereof, but is not limited thereto.

A first interlayer insulation layer 114 is disposed on the first gate electrode GE1. The first interlayer insulation layer 114 can be formed of silicon oxide (SiO2), silicon nitride (SiNx), or the like.

The light emitting display panel 100 can further include an upper buffer layer 115, a second gate insulation layer 116, and a second interlayer insulation layer 117 which are sequentially disposed on the first interlayer insulation layer 114. The polycrystalline thin film transistor TFT1 can include a first source electrode SD1 and a first drain electrode SD2 connected to the first source region and the first drain region, respectively.

The first source electrode SD1 and the first drain electrode SD2 can be a single layer or multiple layer made of any one of molybdenum (Mo), aluminum (Al), chromium (Cr), gold (Au), titanium (Ti), nickel (Ni), neodymium (Nd), and copper (Cu), or alloys thereof, but are not limited thereto.

The upper buffer layer 115 provides the basis for separating the second active layer ACT2 of the oxide thin film transistor TFT2 made of the oxide semiconductor material from the first active layer ACT1 made of the polycrystalline semiconductor material, and for forming the second active layer ACT2.

The second gate insulation layer 116 covers the second active layer ACT2 of the oxide thin film transistor TFT2. Because the second gate insulation layer 116 is formed on the second active layer ACT2 formed of an oxide semiconductor material, the second gate insulation layer 116 is implemented as an inorganic layer. For example, the second gate insulation layer 116 can be silicon oxide (SiO2), silicon nitride (SiNx), or the like.

The second gate electrode GE2 is made of a metal material. For example, the second gate electrode GE2 can be a single layer or multilayer made of any one of molybdenum (Mo), aluminum (Al), chromium (Cr), gold (Au), titanium (Ti), nickel (Ni), neodymium (Nd), and copper (Cu), or alloys thereof, but is not limited thereto.

The oxide thin film transistor TFT2 includes a second active layer ACT2 which is formed on the upper buffer layer 115 and formed of an oxide semiconductor material, a second gate electrode GE2 on the second gate insulation layer 116, a second source electrode SD3 on the second interlayer insulation layer 117, and a second drain electrode SD4 on the second interlayer insulation layer 117.

The second active layer ACT2 includes an intrinsic second channel region made of an oxide semiconductor material and undoped with impurities, and a second source region and a second drain region that are doped with impurities to be conductors.

The oxide thin film transistor TFT2 further includes a light blocking layer LS which is provided below the upper buffer layer 115 and overlaps the second active layer ACT2. The light blocking layer LS can secure reliability of the oxide thin film transistor TFT2 by blocking light incident on the second active layer ACT2. The light blocking layer LS can be formed of the same material as the first gate electrode GE1 and can be formed on an upper surface of the first gate insulation layer 113. The light blocking layer LS can be electrically connected to the second gate electrode GE2 to form a dual gate.

The second source electrode SD3 and the second drain electrode SD4 can be formed of the same material on the second interlayer insulation layer 117 together with the first source electrode SD1 and the first drain electrode SD2, thereby reducing the number of mask processes.

A capacitor CST can be implemented by placing the second electrode CST2 on the first interlayer insulation layer 114 to overlap the first electrode CST1. The second electrode CST2 can be, for example, a single layer or a multilayer made of any one of molybdenum (Mo), aluminum (Al), chromium (Cr), gold (Au), titanium (Ti), nickel (Ni), neodymium (Nd), and copper (Cu), or alloys thereof.

The capacitor CST stores the data voltage applied through the data line DL for a certain period and then provides it to the light emitting device ED. The capacitor CST includes two electrodes corresponding to each other and a dielectric disposed therebetween. A first interlayer insulation layer 114 is disposed between the first electrode CST1 and the second electrode CST2.

The first electrode CST1 or the second electrode CST2 of the capacitor CST can be electrically connected to the second source electrode SD3 or the second drain electrode SD4 of the oxide thin film transistor TFT2. However, the present disclosure is not limited thereto, and the connection relationship of the capacitor CST can be changed based on the pixel driving circuit.

The first planarization layer 118 and the second planarization layer 119 are sequentially provided on the pixel driving circuit to planarize the upper end of the pixel driving circuit. The first planarization layer 118 and the second planarization layer 119 can be an organic layer such as polyimide or acrylic resin.

Moreover, a light emitting device ED is formed on the second planarization layer 119.

The light emitting device ED includes an anode electrode ANO, a cathode electrode CAT, and a light emitting layer EL disposed between the anode electrode ANO and the cathode electrode CAT. When a low potential voltage connected to the cathode electrode CAT is commonly used in pixel driving circuits, the anode electrode ANO is provided as a separate electrode for each subpixel.

The light emitting device ED is electrically connected to the driving device through an intermediate electrode CNE disposed on the first planarization layer 118. Specifically, the anode electrode ANO of the light emitting device ED and the first source electrode SD1 of the polycrystalline thin film transistor TFT1 configuring the pixel driving circuit are connected to each other by an intermediate electrode CNE.

The anode electrode ANO is connected to the intermediate electrode CNE exposed through a contact hole penetrating the second planarization layer 119. Moreover, the intermediate electrode CNE is connected to the first source electrode SD1 exposed through a contact hole penetrating through the first planarization layer 118.

The intermediate electrode CNE functions as a medium connecting the first source electrode SD1 and the anode electrode ANO. The intermediate electrode CNE can be formed of a conductive material such as copper (Cu), silver (Ag), molybdenum (Mo), or titanium (Ti).

The anode electrode ANO can be formed in a multi-layered structure including a transparent conductive layer and an opaque conductive layer having high reflection efficiency. The transparent conductive layer can be made of a material having a relatively large work function value such as indium-tin-oxide (ITO) or indium-zinc-oxide (IZO), and the opaque conductive layer can have a single layer structure or a multilayer structure including aluminum (Al), silver (Ag), copper (Cu), lead (Pb), molybdenum (Mb), titanium (Ti), or an alloy thereof. For example, the anode electrode ANO can be formed in a structure in which a transparent conductive layer, an opaque conductive layer, and a transparent conductive layer are sequentially stacked, or a structure in which a transparent conductive layer and an opaque conductive layer are sequentially stacked.

The light emitting layer EL is formed by stacking a hole-related layer, an organic light emitting layer, and an electron-related layer in order or in reverse order on the anode electrode ANO.

The bank layer BNK can be a pixel defining layer exposing the anode electrode ANO of each pixel. The bank layer BNK can be formed of an opaque material (e.g., black material) to prevent light interference between adjacent pixels. In this case, the bank layer BNK includes a light blocking material made of at least one of color pigment, an organic black, and carbon. A spacer can be further disposed on the bank layer BNK.

The cathode electrode CAT faces the anode electrode ANO with the light emitting layer EL therebetween and is formed on an upper surface and lateral surface of the light emitting layer EL. The cathode electrode CAT can be formed over the entire display area DA as one body. When the cathode electrode CAT is applied to an organic light emitting display apparatus of a front-emitting type, the cathode electrode CAT can be formed of a transparent conductive layer such as indium-tin-oxide (ITO) or indium-zinc-oxide (IZO).

An encapsulation layer 120 for preventing a moisture penetration can be further disposed on the cathode electrode CAT.

The encapsulation layer 120 can prevent external moisture or oxygen from penetrating into the light emitting device ED, which is vulnerable to external moisture or oxygen. To this end, the encapsulation layer 120 can include at least one inorganic encapsulation layer and at least one organic encapsulation layer, but is not limited thereto. In the present disclosure, the structure of the encapsulation layer 120 in which a first encapsulation layer 121, a second encapsulation layer 122, and a third encapsulation layer 123 are sequentially stacked will be described as an example.

The first encapsulation layer 121 is formed on the substrate 111 on which the cathode electrode CAT is formed. The third encapsulation layer 123 is formed on the substrate 111 on which the second encapsulation layer 122 is formed, and can be formed to surround an upper surface, a lower surface, and a lateral surface of the second encapsulation layer 122 together with the first encapsulation layer 121. The first encapsulation layer 121 and the third encapsulation layer 123 can minimize or prevent external moisture or oxygen from penetrating into the light emitting device ED. The first encapsulation layer 121 and the third encapsulation layer 123 can be formed of an inorganic insulation material capable of low-temperature deposition such as silicon nitride (SiNx), silicon oxide (SiOx), silicon oxynitride (SiON), or aluminum oxide ($Al_2O_3$). Because the first encapsulation layer 121 and the third encapsulation layer 123 are deposited in a low-temperature atmosphere, it is possible to prevent damage to the light emitting device ED vulnerable to the high-temperature atmosphere during the deposition process of the first encapsulation layer 121 and the third encapsulation layer 123.

The second encapsulation layer 122 can functions as a buffer to relieve stress between each layer due to the bending of the light emitting display apparatus 10, and can planarizing the step between each layer. The second encapsulation layer 122 can be formed on the substrate 111 on which the first encapsulation layer 121 is formed, and can be formed of a non-photosensitive organic insulation material such as acrylic resin, epoxy resin, phenolic resin, polyamide resin, polyimide resin, polyethylene and silicon oxycarbon (SiOC), or a photosensitive organic insulation material such as photoacryl, but is limited thereto. When the second encapsulation layer 122 is formed through an inkjet method, a dam DAM can be disposed to prevent the liquid second encapsulation layer 122 from diffusing to the edge of the substrate 111. The dam DAM can be disposed closer to the edge of the substrate 111 than the second encapsulation layer 122. By the dam DAM, it is possible to prevent the second encapsulation layer 122 from diffusing to a pad area where a conductive pad disposed at the outermost side of the substrate 111 is disposed.

The dam DAM is designed to prevent the diffusion of the second encapsulation layer 122, but when the second encapsulation layer 122 is formed beyond the height of the dam DAM during the process, the second encapsulation layer 122, which is an organic layer, can be exposed to the outside, and thus moisture or the like can easily penetrate into the light emitting device ED. Therefore, in order to prevent this, at least 10 dams can be repeatedly formed.

The dam DAM can be disposed on the second interlayer insulation layer 117 of the non-display area NDA.

Moreover, the dam DAM can be formed simultaneously with the first planarization layer 118 and the second planarization layer 119. For example, when the first planarization layer 118 is formed, a lower layer of the dam DAM is formed together, and when the second planarization layer 119 is formed, an upper layer of the dam DAM is formed together, and thus the dam DAM can be formed in a double structure.

Therefore, the dam DAM can be formed of the same material as the first planarization layer 118 and the second planarization layer 119, but is not limited thereto.

The dam DAM can be formed to overlap a low potential driving power line VSS. For example, the low potential driving power line VSS can be formed in a lower layer of a region in which the dam DAM is provided in the non-display area NDA.

The low potential driving power line VSS and a gate driver 200 formed in GIP (Gate In Panel) type are formed to surround the outer portion of the display panel, and the low potential driving power line VSS can be provided outside the gate driver 200. Moreover, the low potential driving power line VSS can be connected to the cathode electrode CAT to supply a common voltage. The gate driver 200 is simply illustrated in a plan view and a cross-sectional view, but can be formed by using a thin film transistor having the same structure as the thin film transistor in the display area DA.

The low potential driving power line VSS is disposed outside the gate driver 200. The low potential driving power line VSS is disposed outside the gate driver 200 and surrounds the display area DA. For example, the low potential driving power line VSS can be made of the same material as the first gate electrode GE1, but is not limited thereto, and thus can be made of the same material as the second electrode CST2 or the first source and drain electrodes SD1 and SD2.

Moreover, the low potential driving power line VSS can be electrically connected to the cathode electrode CAT. The low potential driving power line VSS can supply the low potential driving voltage EVSS to a plurality of pixels of the display area DA.

A touch layer can be disposed on the encapsulation layer 120. In the touch layer, a touch buffer layer 151 can be provided between a touch sensor metal including touch electrode connection lines 152 and 154 and touch electrodes 155 and 156, and the cathode electrode CAT of the light emitting device ED.

The touch buffer layer 151 can prevent liquid chemical (for example, developers or etchants), which is used during the manufacturing process of the touch sensor metal disposed on the touch buffer layer 151, or moisture from the outside from penetrating into the light emitting layer EL including organic material. Accordingly, the touch buffer layer 151 can prevent damage to the light emitting layer EL which is vulnerable to the liquid chemical or the moisture.

The touch buffer layer 151 is made of an organic insulation material which can be formed at a low temperature below a certain temperature (e.g., 100 degrees (° C.)) and has a low dielectric constant of 1 to 3 to prevent damage to the light emitting layer EL including organic substances vulnerable to high temperatures. For example, the touch buffer layer 151 can be formed of an acrylic, epoxy, or siloxane-based material. The touch buffer layer 151, which has planarization performance with an organic insulation material, can prevent a damage to the encapsulation layer 120 and breaking of the touch sensor metal formed on the touch buffer layer 151 due to the bending of the light emitting display apparatus 10.

According to the mutual-capacitance-based touch sensor structure, the touch electrodes 155 and 156 are provided on the touch buffer layer 151, and the touch electrodes 155 and 156 can be arranged to cross each other.

The touch electrode connection line 152 can electrically connect the touch electrodes 155 and 156. The touch electrode connection lines 152 and 154 and the touch electrodes 155 and 156 can be provided on different layers with a touch insulation layer 153 therebetween.

The touch electrode connection lines 152 and 154 can be disposed to overlap the bank layer BNK, thereby preventing the aperture ratio from decreasing.

A part of the touch electrode connection line 152 can extend over the upper and lateral end of the encapsulation layer 120 and the upper and lateral end of the dam DAM to be electrically connected to the touch driving circuit through the touch pad PAD.

A part of the touch electrode connection line 152 can receive a touch driving signal from the touch driving circuit and transmit it to the touch electrodes 155 and 156, and transmit a touch sensing signal from the touch electrodes 155 and 156 to the touch driving circuit.

A touch passivation layer 157 can be disposed on the touch electrodes 155 and 156. In FIG. 12, the touch passivation layer 157 is illustrated as being disposed only on the touch electrodes 155 and 156, but is not limited thereto, and thus the touch passivation layer 157 can extend to front or rear side of the dam DAM to be disposed on the touch electrode connection line 152.

Moreover, a color filter can be further provided on the encapsulation layer 120, and the color filter can be provided on the touch layer or between the encapsulation layer 120 and the touch layer.

According to the present disclosure, the luminance of the lower compensation pixels corresponding to the lower compensation values can be normally compensated. Accordingly, smears caused by abnormal pixels can be reduced, minimized or eliminated, and thus the quality of the light emitting display apparatus can be improved.

For example, according to the present disclosure, even when the luminance of the upper compensation pixels corresponding to the upper compensation values is not normally compensated, the luminance of the lower compensation pixels provided more than the upper compensation pixels in the light emitting display panel can be normally compensated. Accordingly, the quality of the light emitting display panel can be improved.

The above-described feature, structure, and effect of the present disclosure are included in at least one embodiment of the present disclosure, but are not limited to only one embodiment. Furthermore, the feature, structure, and effect described in at least one embodiment of the present disclosure can be implemented through combination or modification of other embodiments by those skilled in the art. Therefore, content associated with the combination and modification should be construed as being within the scope of the present disclosure.

It will be apparent to those skilled in the art that various modifications and variations can be made in the present disclosure without departing from the spirit or scope of the disclosures. Thus, it is intended that the present disclosure covers the modifications and variations of this disclosure provided they come within the scope of the appended claims and their equivalents.

What is claimed is:

1. A light emitting display apparatus comprising:

a light emitting display panel including a plurality of pixels configured to display images, where some of the plurality of pixels can operate as normal pixels while some of the plurality of pixels can operate as abnormal pixels;

a control driver configured to receive input image data of the normal pixels and the abnormal pixels and convert the input image data into image data; and a data driver configured to output data voltages corresponding to the image data to the normal pixels and the abnormal pixels, wherein compensation values for compensating the input image data of the abnormal pixels are stored in the control driver in a manufacturing process of manufacturing the light emitting display panel, wherein the control driver is configured to:

calculate final compensation values for the abnormal pixels by using lower compensation values excluding upper compensation values included in an upper K % of the compensation values, calculate reference range grays by using the final compensation values, compensate the input image data of the abnormal pixels by using the final compensation values, where K is a real number, K has a constant value, and K is set in the manufacturing process to be stored in the control driver, and rescale grays of the input image data of the abnormal pixels compensated by using the final compensation values and the input image data of the normal pixels into the reference range grays, wherein input image data of the abnormal pixels having the upper compensation values included in the upper K % are compensated with a same compensation value, and wherein the same compensation value is a maximum compensation value of the final compensation values.

2. The light emitting display apparatus of claim 1, wherein the compensation values are different based on degrees of smears associated with the abnormal pixels.

3. The light emitting display apparatus of claim 1, wherein K is a number that falls in a range of 0.05 to 0.15.

4. The light emitting display apparatus of claim 1, wherein a reference compensation value is stored in the control driver, and the control driver extracts the maximum compensation value among the lower compensation values, and calculates a ratio between the maximum compensation value and the reference compensation value as a compensation ratio.

5. The light emitting display apparatus of claim 4, wherein the control driver calculates the final compensation values for the abnormal pixels corresponding to the lower compensation values by using the compensation ratio.

6. The light emitting display apparatus of claim 5, wherein the compensation ratio is a ratio between the lower compensation values and the final compensation values for the abnormal pixels corresponding to the lower compensation values.

7. The light emitting display apparatus of claim 4, wherein the control driver set the maximum compensation value as the final compensation values for the abnormal pixels corresponding to the upper compensation values.

8. The light emitting display apparatus of claim 7, wherein the control driver converts the input image data rescaled to have the reference range grays into the image data, and transmits the image data to the data driver.

9. The light emitting display apparatus of claim 7, wherein the control driver compensates the input image data of the abnormal pixels by adding the final compensation values to grays of the input image data of the abnormal pixels.

10. The light emitting display apparatus of claim 9, wherein the control driver converts a maximum value of grays of the compensated input image data into a maximum value of the reference range grays to generate the reference range grays.

* * * * *